(12) United States Patent
Tsujimoto

(10) Patent No.: US 9,014,084 B2
(45) Date of Patent: Apr. 21, 2015

(54) TRANSCEIVER SYSTEM AND OPERATION METHOD THEREOF

(75) Inventor: Yoshitaka Tsujimoto, Tama (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 998 days.

(21) Appl. No.: 13/118,405

(22) Filed: May 28, 2011

(65) Prior Publication Data

US 2011/0294442 A1 Dec. 1, 2011

(30) Foreign Application Priority Data

Jun. 1, 2010 (JP) ................................. 2010-126025

(51) Int. Cl.
*H04W 88/02* (2009.01)
*H04L 12/413* (2006.01)
*H04W 52/02* (2009.01)

(52) U.S. Cl.
CPC ............. *H04L 12/413* (2013.01); *H04W 52/02* (2013.01)

(58) Field of Classification Search
None
See application file for complete search history.

(56) References Cited

U.S. PATENT DOCUMENTS

| 5,710,975 | A * | 1/1998 | Bernhardt et al. ........... 340/7.22 |
| 7,330,736 | B2 * | 2/2008 | Redi ........................... 455/553.1 |
| 7,831,282 | B2 * | 11/2010 | Luebke et al. ................ 455/574 |
| 2003/0110323 | A1 * | 6/2003 | Togawa ........................... 710/15 |
| 2007/0263558 | A1 * | 11/2007 | Salomone ..................... 370/318 |

OTHER PUBLICATIONS

Maruti Gupta et al., "Dynamic Ethernet Link Shutdown for Energy Conservation on Ethernet Links" IEEE International Conference on Communications, 2007, ICC '07, Jun. 24-28, 2007, pp. 6156-6161.
82541 Family of Gigabit Ethernet Controllers, Datasheet Intel Corporation, 2007, pp. 1-46, http://jp.ic-on-line.cn/IOL/datasheet/82541_443211l.pdf [Retrieved Mar. 30, 2010].

* cited by examiner

*Primary Examiner* — Anh-Vu Ly
*Assistant Examiner* — Hashim Bhatti
(74) *Attorney, Agent, or Firm* — Miles & Stockbridge P.C.

(57) ABSTRACT

A transceiver system which can communicate a plurality of linked partners, and the increase in power consumption by the transceiver system can be minimized. The transceiver system includes a transceiver, and a communication controller. The transceiver is capable of performing transmitted and received data communication with terminal devices. The communication controller is capable of controlling the memory transfer of transmitted and received data. The transceiver system can be set to an operation mode selected from among intermittent- and uninterrupted-operation modes. In the intermittent-operation mode, the transceiver and the communication controller work alternately, whereas in the uninterrupted-operation mode, the transceiver and the communication controller works in parallel. The operation mode of the transceiver system is set according to unique identification data of terminal devices. In a working period of the communication controller in the intermittent-operation mode, the operation of the transceiver is stopped by the control signal.

20 Claims, 12 Drawing Sheets

Fig.6

| MODE | | CLOCK OPERATION | COMMUNICATION CONTROLLER(MAC) | PHY |
|---|---|---|---|---|
| INTERMITTENT OPERATION | PACKET TRANSFER | PLL OUTPUT: 50 MHz (High-speed operation) RTC OUTPUT: 32 kHz (Low-speed operation) | Transfer packets from the buffer with the aid of CPU and DMAC. | With the power supply shut down |
| | PACKET BUFFERING | PLL OUTPUT: 10 MHz (Intermediate-speed operation) RTC OUTPUT: 32 kHz (Low-speed operation) | PHY buffers input packets in the buffer. With the other modules e.g. CPU and DMAC slowed down, or suspended. | In action |
| UNINTERRUPTED OPERATION | | PLL OUTPUT: 50 MHz (High-speed operation) RTC OUTPUT: 32 kHz (Low-speed operation) | Receives input packets via PHY, and transfer the received packets with the aid of CPU and DMAC. | In action |

Fig.7

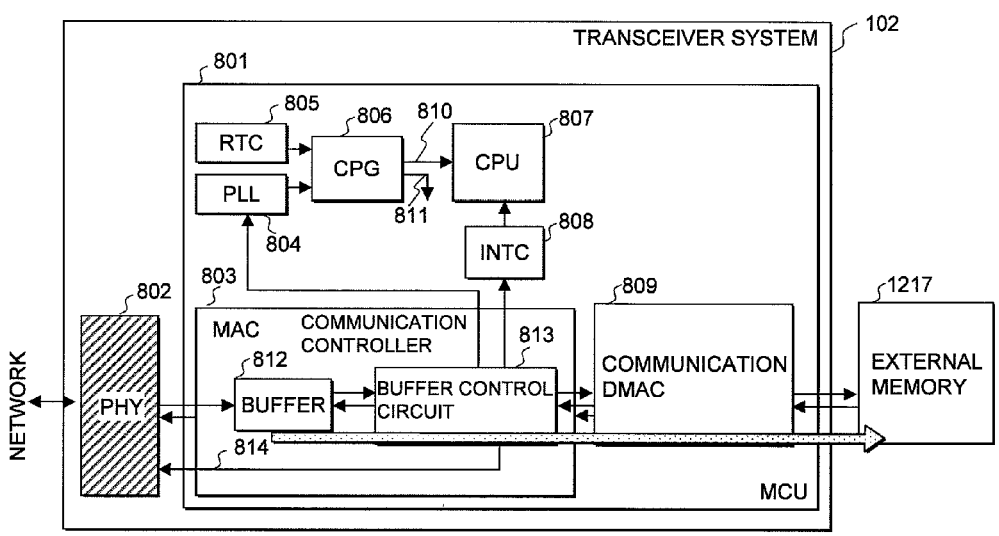

| NAME OF TRANSMITTER | MODE (INTERMITTENT/ UNINTERRUPTED) | MAC ADDRESS SETTING | TRANSMIT DATA SIZE [BYTE] | PACKET ACCUMULATION TIME | PHY DOWNTIME | PACKET BUFFERING TIME THRESHOLD |
|---|---|---|---|---|---|---|
| AIR CONDITIONING DEVICE | AUTOMATICALLY SELECTED | NOT MADE | 128 | 100 μs | 1 ms | 2 kilobytes |
| MONITORING CAMERA | | MADE | 76800 | | | |
| SECURITY CONTROL DEVICE | | NOT MADE | 256 | | | |

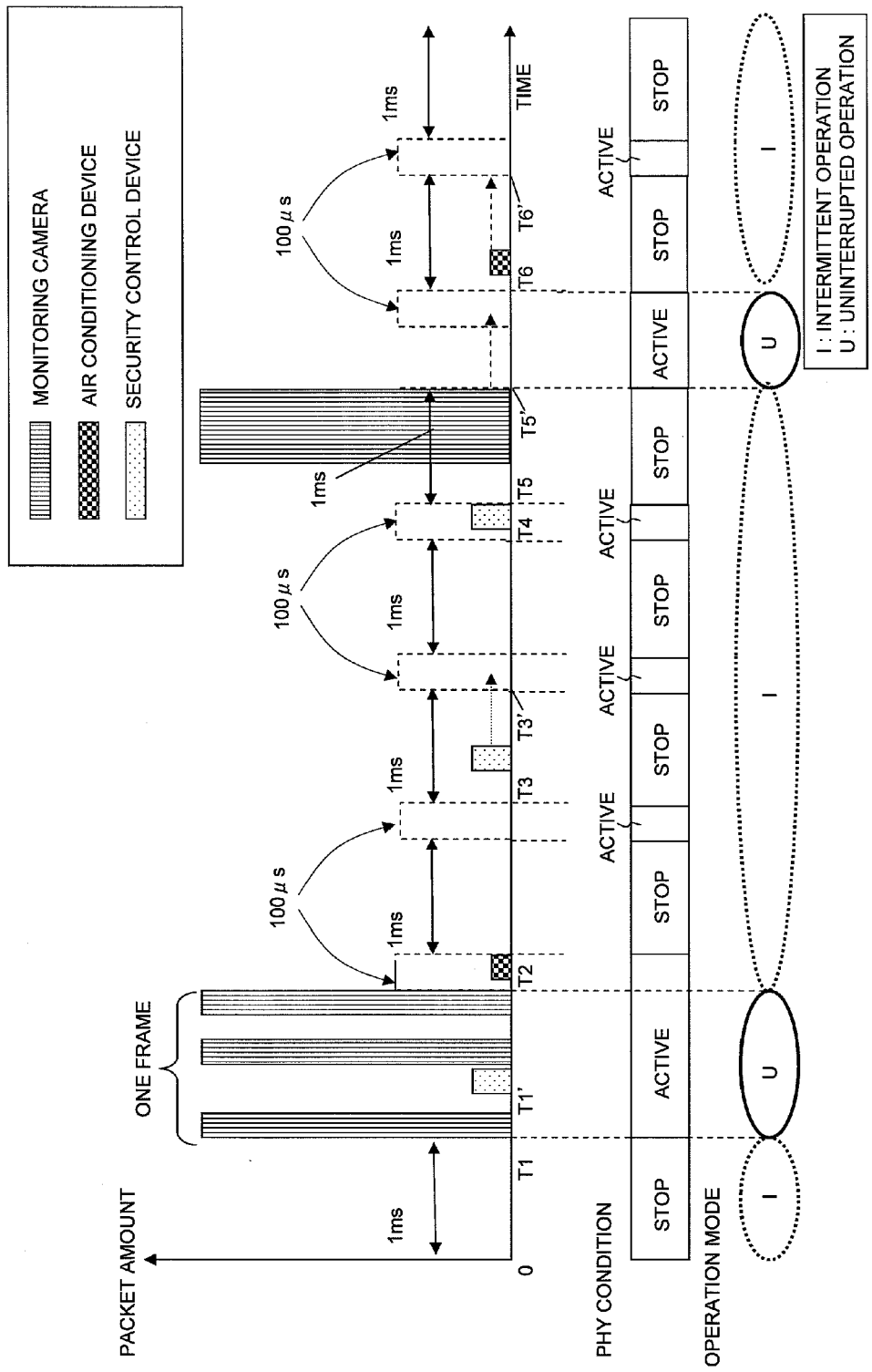

Fig.14
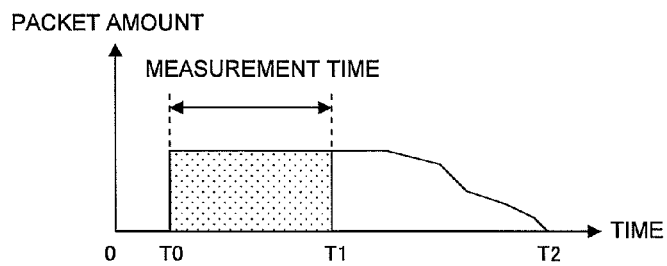
PACKET AMOUNT
MEASUREMENT TIME
0  T0   T1        T2  TIME
Fig.15
| INTERVAL OF MEASUREMENT | THRESHOLD OF PACKET AMOUNT |
|---|---|
| 120 μs | 1500Byte |
Fig.16
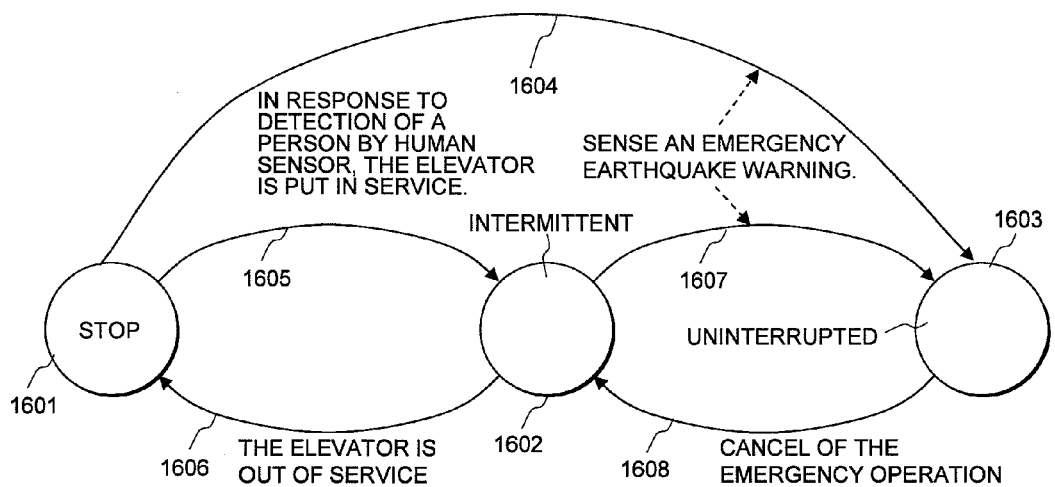

| TIME (Hour) | MODE |
|---|---|
| 0 | INTERMITTENT OPERATION |
| 1 | INTERMITTENT OPERATION |
| ... | INTERMITTENT OPERATION |
| 6 | INTERMITTENT OPERATION |
| 7 | UNINTERRUPTED OPERATION |
| ... | UNINTERRUPTED OPERATION |
| 21 | UNINTERRUPTED OPERATION |
| 22 | INTERMITTENT OPERATION |
| 23 | INTERMITTENT OPERATION |

TRANSCEIVER SYSTEM AND OPERATION METHOD THEREOF

CROSS-REFERENCE TO RELATED APPLICATIONS

The Present application claims priority from Japanese application JP 2010-126025 filed on Jun. 1, 2010, the content of which is hereby incorporated by reference into this application.

BACKGROUND

The present invention relates to a transceiver system and the operation method thereof, and particularly it relates to a technique useful to arrange a transceiver system operable to communicate with partners linked therewith, and minimize the increase in power consumption.

In recent years, electronic devices having a function for network communication using a network such as Ethernet (registered trademark) have been in common use. In general, such network is constituted by LAN (Local Area Network) installed in a building, a house or the like.

LAN communication is classified into an infrastructure-communication mode, and an ad hoc communication mode. In the infrastructure-communication mode, LAN communication terminals or stations make connections via hubs at access points. However, in the ad hoc communication mode, LAN terminals or stations can communicate without going through access points' hubs. In the infrastructure-communication mode, it is indispensable to set an infrastructure equipment at an access point, whereas the ad hoc communication mode does not need such infrastructure equipment.

However, in the ad hoc communication mode, a receiving-side LAN terminal cannot determine when LAN terminals issue a transmitted packet, and therefore the receiving-side LAN terminal needs to keep working at all times. A LAN terminal includes a physical-layer transceiver (PHY: PHysical Layer), and a logical-layer MAC (Media Access Controller). The physical-layer transceiver can be adapted to various physical characteristics such as the communication speed and communication range of LAN communication media. Further, MAC (Media Access Controller) controls the memory transfer of data packets to send/receive. In other words, the physical-layer transceiver of a LAN terminal is connected to a number of linked partners through LAN, and executes data packet communications therewith, whereas MAC (Media Access Controller) executes packet transfer with the aid of DMAC (Direct Memory Access Controller) performing memory transfer; the action of DMAC is under the control of CPU (Central Processing Unit). Hence, in the ad hoc communication mode, the operation that a LAN terminal performs uninterruptedly at all times increases the power consumption by the physical-layer transceiver of the LAN terminal.

Although there is no description about the ad hoc communication mode, the way of dynamically shutting down Etherlink during Etherlink communication between a set of a transmitter and receiver is described by Maruti Gupta et al, "Dynamic Ethernet Link Shutdown for Energy Conservation on Ethernet Links", IEEE International Conference on Communications, 2007. ICC '07, 24-28 Jun. 2007, PP. 6156-6161. Further, although there is no description about the ad hoc communication mode, a gigabit Ethernet controller which is set to Smart Power Down mode when no signal is detected on the wire is described in: 82541 Family of Gigabit Ethernet Controllers, Datasheet Intel Corporation, at http://jp.ic-online.cn/IOL/datasheet/82541_4432111.pdf, which is a result of searching the Internet on Mar. 30, 2010.

SUMMARY

Prior to the invention, the inventors have been engaged in the research and development of a transceiver system capable of receiving transmitted packets from a number of LAN terminals in line with an appropriate transmission timing, and of sending transmit data to other LAN terminals including a data server in the ad hoc communication mode.

However, the study by the inventors revealed that the ad hoc communication mode has the problem of the increase in electric power consumed by the physical-layer transceiver of the transceiver system of a receiving-side LAN terminal on condition that the receiving-side LAN terminal works uninterruptedly at all times because the LAN terminal cannot determine when LAN terminals issue a transmitted packet.

From the study made by the inventors prior to the invention, it becomes clear that a number of LAN terminals—linked partners—compliant with the ad hoc communication mode include a wide variety of LAN terminals, e.g. terminals which transmit a significantly large amount of packet data, and terminals which transmit a significantly small amount of packet data.

The invention was made as a result of the prior study by the inventors as described above.

Therefore, it is an object of the invention to provide a technique for arranging a transceiver system operable to communicate with partners linked therewith, and minimizing the increase in power consumption.

The above and other subjects of the invention and novel features thereof will become apparent from the description hereof and the accompanying drawings.

Of the embodiments herein disclosed, a representative one will be briefly outlined below.

A transceiver system (102) according to the representative embodiment of the invention has a transceiver (802) and a communication controller (803).

The transceiver (802) is capable of executing transmitted and received data communications with a plurality of terminal devices (101*a*, 101*b*, 101*c*, . . . , 103).

The communication controller (803) can control memory transfer of the transmitted and received data.

The transceiver system (102) can be set to one operation mode selected from among an intermittent-operation mode and an uninterrupted-operation mode.

In the intermittent-operation mode, an operation of the transceiver (802), and an operation of the communication controller (803) are executed alternatively.

In the uninterrupted-operation mode, the operation of the transceiver (802), and the operation of the communication controller (803) are executed in parallel (see FIGS. 3, 5, and 6).

The effect achieved by the representative embodiment is briefly as follows.

According to the invention, the following are made possible: to provide a transceiver system operable to communicate with partners linked therewith; and to minimize the increase in the power consumption thereof.

BRIEF DESCRIPTION OF THE DRAWINGS

FIG. 6 is a table summarizing the features of the intermittent-operation mode and the uninterrupted-operation mode put into effect in the semiconductor integrated circuit according to the first embodiment of the invention shown in FIG. 5, which materializes the transceiver system 102 of FIG. 1;

FIG. 7 is a diagram for explaining the way that the semiconductor integrated circuit according to the first embodiment of the invention, which is shown in FIG. 5, works in "packet transfer" in the intermittent-operation mode;

FIG. 13 is a diagram for explaining the operation by the semiconductor integrated circuit according to the first embodiment of the invention, which materializes the transceiver system 102 as described with reference to FIGS. 1 to 12, when receiving packets, provided that the packets are transmitted by the air conditioning device 101a, monitoring camera 101b, and security control device 101c of the building management system shown in FIG. 3;

FIG. 14 is a diagram showing the change in the packet rate of a received packet supplied to the buffer 1302 for operation mode judgment shown in FIG. 10 with respect to time;

FIG. 15 is a diagram showing an example of the set threshold 1330 set in the packet-rate-threshold-setting register 1329 shown in FIG. 10 in order to judge the received packet rate which has been described with reference to FIG. 14;

FIG. 16 is a diagram showing the transition of the operation mode of the transceiver system 102 and the change in the situation involved with it during the receive operation by the transceiver system 102 on condition that the monitoring camera 101b of the building management system shown in FIG. 3 is put in an elevator for moving up and down;

DETAILED DESCRIPTION

1. Summary of the Embodiments

Figure 1:
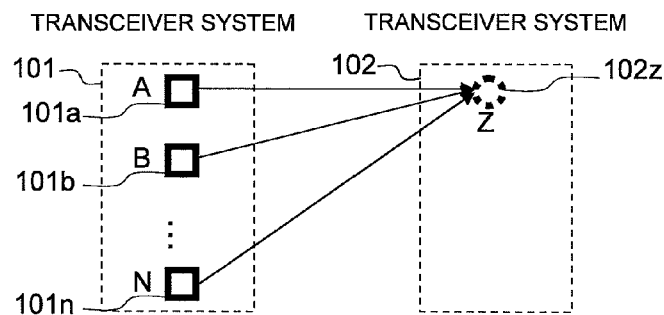
FIG. 1 is a diagram for explaining how a transceiver system 102 materialized by a semiconductor integrated circuit according to the first embodiment of the invention exchanges data with another transceiver system 101.

The preferred embodiments of the invention herein disclosed will be outlined first. Here, the reference numerals or characters for reference to the drawings, which are accompanied with paired round brackets, only exemplify what the concepts of members or components referred to by the numerals or characters contain.

[1] A transceiver system (102) according to a preferred embodiment of the invention includes a transceiver (802), 1 and a communication controller (803).

The transceiver (802) is capable of executing transmitted and received data communications with a plurality of terminal devices (101a, 101b, 101c, . . . , 103).

The communication controller (803) can control memory transfer of the transmitted and received data.

The transceiver system (102) can be set to one operation mode selected from among an intermittent-operation mode and an uninterrupted-operation mode.

In the intermittent-operation mode, the operation of the transceiver (802), and the operation of the communication controller (803) are executed alternately.

Figure 3:
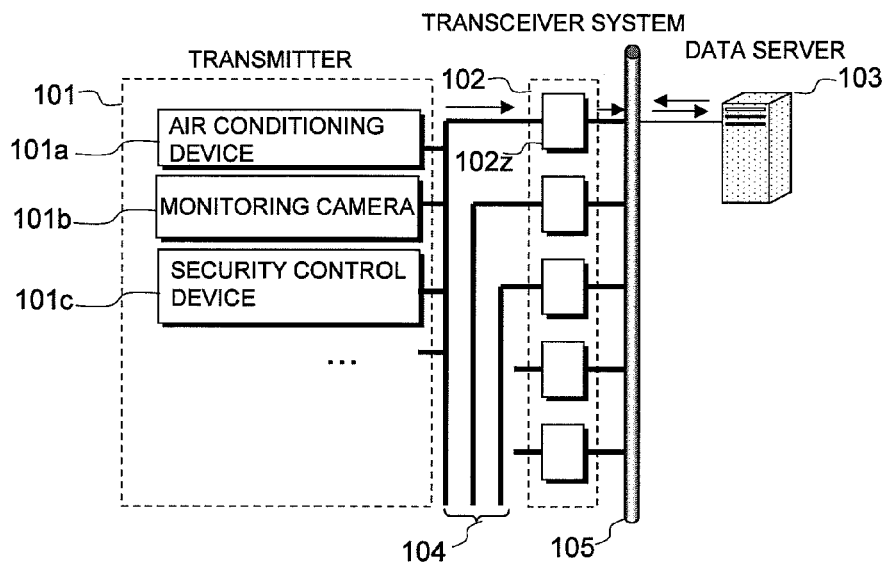
FIG. 3 is a diagram showing an example of the configuration of a building management system as an application of the transceiver system 102 formed by the semiconductor integrated circuit according to the first embodiment of the invention as shown in FIG. 1.
Figure 5:
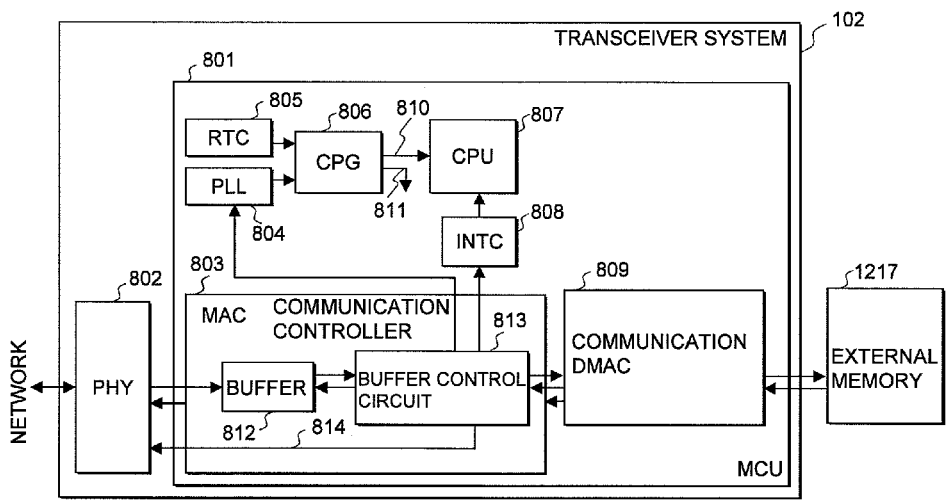
FIG. 5 is a diagram showing a structure of the semiconductor integrated circuit according to the first embodiment of the invention, which materializes the transceiver system 102 shown in FIG. 1.

In the uninterrupted-operation mode, the operation of the transceiver (802), and the operation of the communication controller (803) are executed in parallel (see FIGS. 3, 5 and 6).

According to the above-described embodiment, it is possible to arrange a transceiver system which can communicate with a plurality of linked partners with the increase in the power consumption minimized.

According to a preferred embodiment of the invention, the transceiver system (102) can be set in the one operation mode according to unique identification data of the plurality of terminal devices (see FIGS. 5 and 6).

According to another preferred embodiment of the invention, in the intermittent-operation mode, supply of an operating-source voltage to the transceiver (802) is stopped according to a control signal (814) generated by the communication controller (803), thereby to stop the operation of the transceiver (802) for a period where the operation of the communication controller (803) is executed (see FIGS. 5 and 6).

Further, according to a more preferred embodiment of the invention, the transceiver system (102) further includes: a central processing unit (807); and a direct memory access controller (809).

The transceiver (802) is arranged to serve as a physical-layer transceiver (PHY) which can cope with a physical feature of a network to which the plurality of terminal devices are linked.

The communication controller (803) is arranged to serve as a logical-layer media access controller (MAC) operable to control the central processing unit (807) and the direct memory access controller (809).

The memory transfer of transmitted and received data by the communication controller (803) is executed by the direct memory access controller (809) which is controlled according to operation control by the central processing unit (807) (see FIG. 5).

According to a more preferred embodiment of the invention, the communication controller (803) includes a buffer memory (812) operable to buffer transmitted data sent from the plurality of terminal devices.

The transmitted data can be buffered in the buffer memory during the operation of the transceiver in intermittent-operation mode, and the transmitted data buffered in the buffer memory are read out during the operation of the communication controller in the intermittent-operation mode (see FIG. 5).

Further, according to another more preferred embodiment of the invention, during the operation of the communication controller in the intermittent-operation mode, the transmitted data read from the buffer memory are subjected to memory transfer by the direct memory access controller (see FIG. 5).

Figure 10:
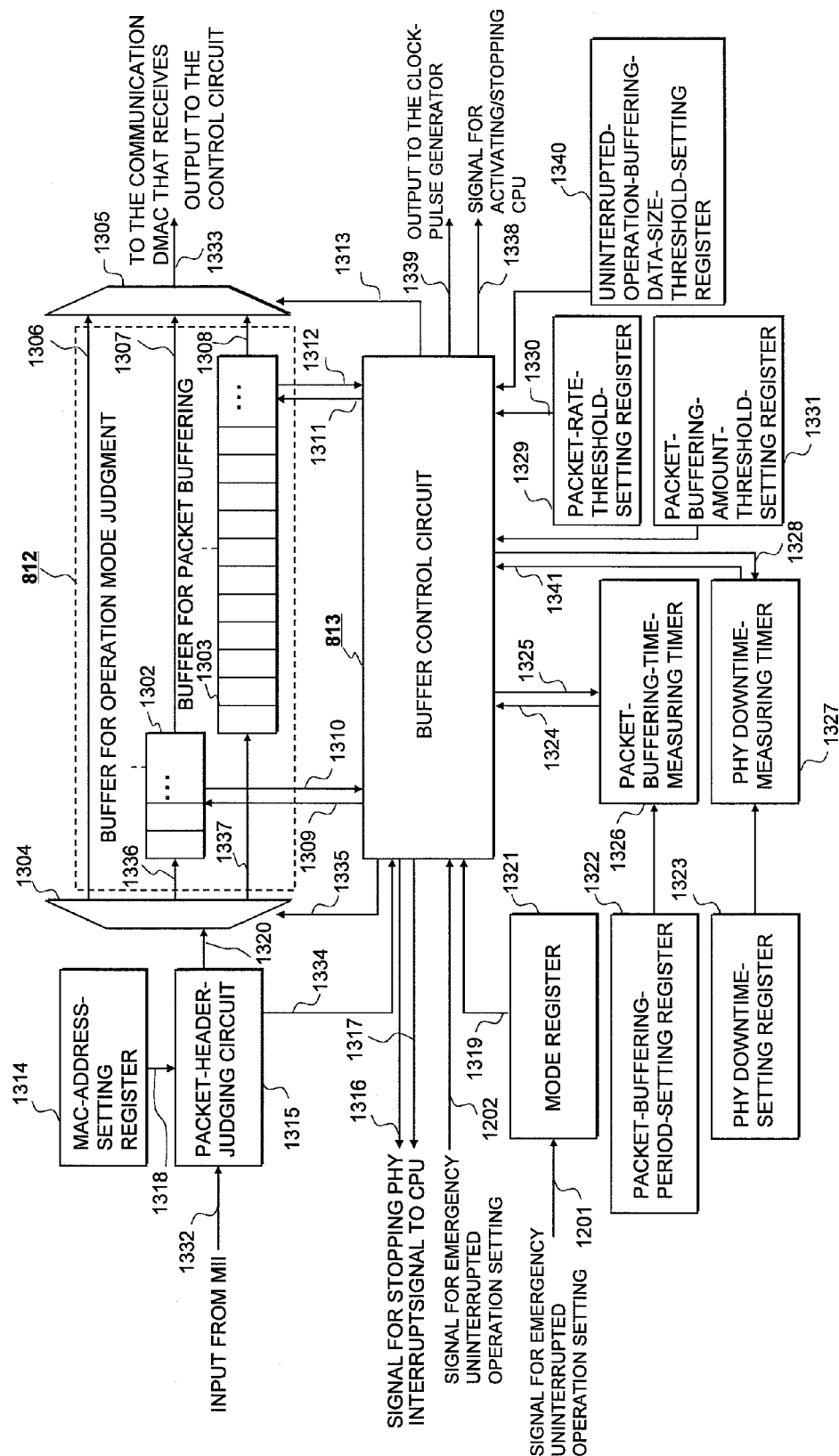
FIG. 10 is a diagram showing a circuit configuration of the buffer memory 812, buffer control circuit 813, and others included in the communication controller 803 of the micro controller unit 801 of the transceiver system 102 associated with the first embodiment of the invention and shown in FIG. 9.

According to a concrete embodiment of the invention, the unique identification data of the plurality of terminal devices are packet header data of the transmitted data transmitted by the plurality of terminal devices (see FIG. 10).

According to a more concrete embodiment of the invention, the packet header data of the transmitted data as the unique identification data of the plurality of terminal devices are address data of the plurality of terminal devices (see FIG. 10).

According to another more concrete embodiment of the invention, the communication controller (803) includes an address-setting register (1314) for storing the address data as the unique identification data for setting the operation mode of the transceiver system (102) to the uninterrupted-operation mode, which is the one operation mode (see FIG. 10).

According to the most concrete embodiment of the invention, the communication controller (803) can be supplied with an external control signal (1201, 1202) provided from outside the transceiver system (102).

Figure 9:
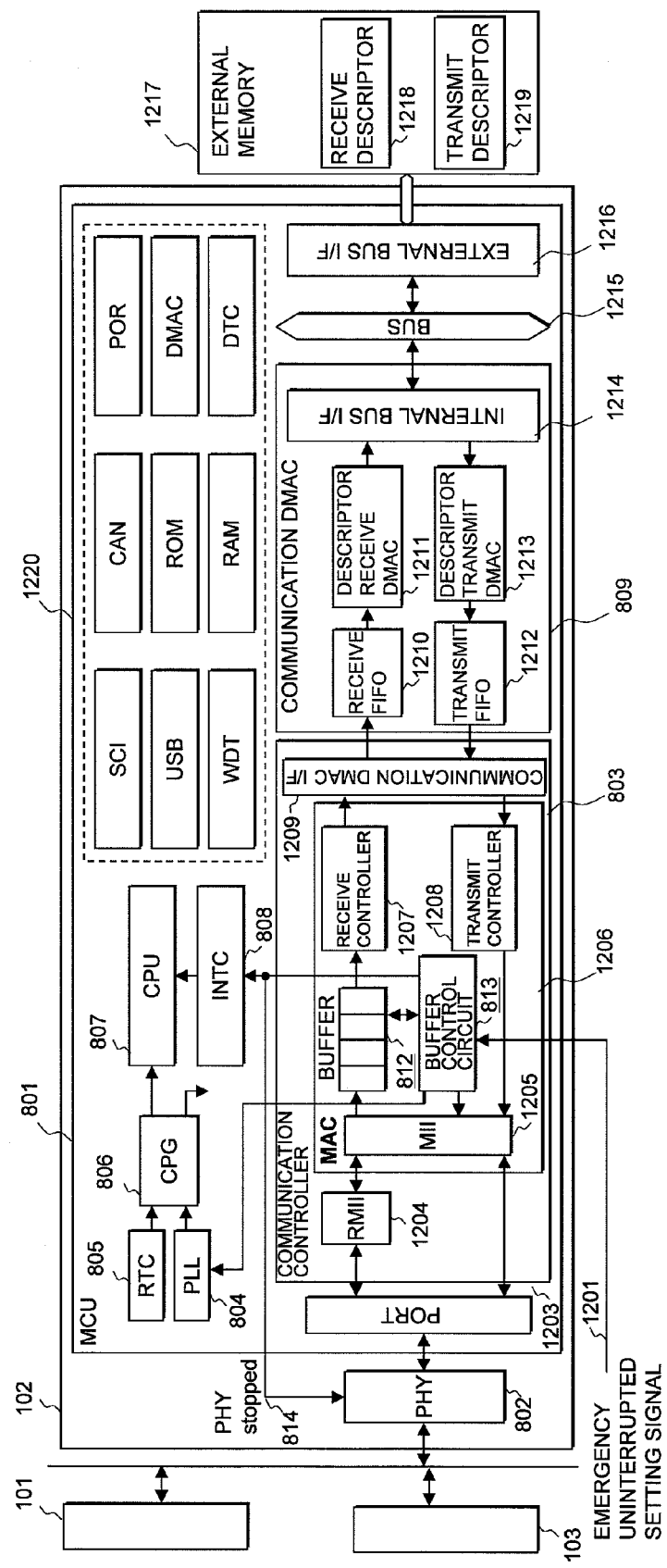
FIG. 9 is a diagram showing the structure of the semiconductor integrated circuit according to the first embodiment of the invention shown in FIG. 5 further in detail.

The communication controller (803) is capable of forcibly setting an operation mode of the transceiver system (102) to the uninterrupted-operation mode in response to the external control signal (1201, 1202) (see FIG. 9).

[2] Another representative embodiment of the invention provides a method of operating a transceiver system (102) including a transceiver (802) and a communication controller (803).

The transceiver (802) is capable of executing transmitted and received data communications with a plurality of terminal devices (101a, 101b, 101c, . . . , 103).

The communication controller (803) is capable of controlling memory transfer of the transmitted and received data.

The transceiver system (102) can be set to one operation mode selected from among an intermittent-operation mode and an uninterrupted-operation mode.

In the intermittent-operation mode, the operation of the transceiver (802), and the operation of the communication controller (803) are executed alternately.

In the uninterrupted-operation mode, the operation of the transceiver (802), and the operation of the communication controller (803) are executed in parallel (see FIGS. 3, 5 and 6).

According to the above-described embodiment, it is possible to arrange a transceiver system which can communicate with a plurality of linked partners with the increase in the power consumption minimized.

2. Further Detailed Description of the Embodiments

Next, the embodiments will be described further in detail. Now, as to all the drawings, to which are referred for describing the best mode for carrying out the invention, like parts or components are identified by the same reference numeral or character, and the repetition thereof is avoided.

First Embodiment

Sending/Receiving Operation

FIG. 1 is a diagram for explaining how a transceiver system 102 materialized by a semiconductor integrated circuit according to the first embodiment of the invention exchanges data with another transceiver system 101.

As shown in FIG. 1, the transceiver system 101 may be composed of a unified single-body transceiver system 101, or a plurality of transceiver units 101a, 101b, . . . , 101n placed in difference locations. The transceiver system 101 and the transceiver system 102 are connected with each other through a network, such as Ethernet (registered trademark).

The transceiver system 102 according to the first embodiment of the invention is materialized in the form of a semiconductor integrated circuit constituted as MCU (Micro Controller Unit) including a CPU (Central Processing Unit). Particularly, the transceiver system 102 according to the first embodiment of the invention includes a physical-layer transceiver (PHY) operable to execute data communication with the transceiver system 101 connected with the transceiver system 102 via a network, and a MAC connected with the physical-layer transceiver and CPU; PHY stands for "physical layer" and MAC stands for "media access controller".

<<Uninterrupted Operation and Intermittent Operation>>

The operation mode of the transceiver system 102 according to the first embodiment of the invention is automatically set to one operation mode selected from among "uninterrupted-operation mode" and "intermittent-operation mode"; the selected operation mode is decided based on e.g. unique identification data of the transceiver units 101a, 101b and 101c, etc. of the transceiver system 101, which is a linked partner, and their working conditions, or the condition of an external device, which is to be described later. In the uninterrupted-operation mode, the physical-layer transceiver (PHY) and media access controller (MAC) of the transceiver system 102 executes an uninterrupted operation, whereas in the intermittent-operation mode, the physical-layer transceiver (PHY) and media access controller (MAC) of the transceiver system 102 conducts intermittent operations alternately.

Figure 2:
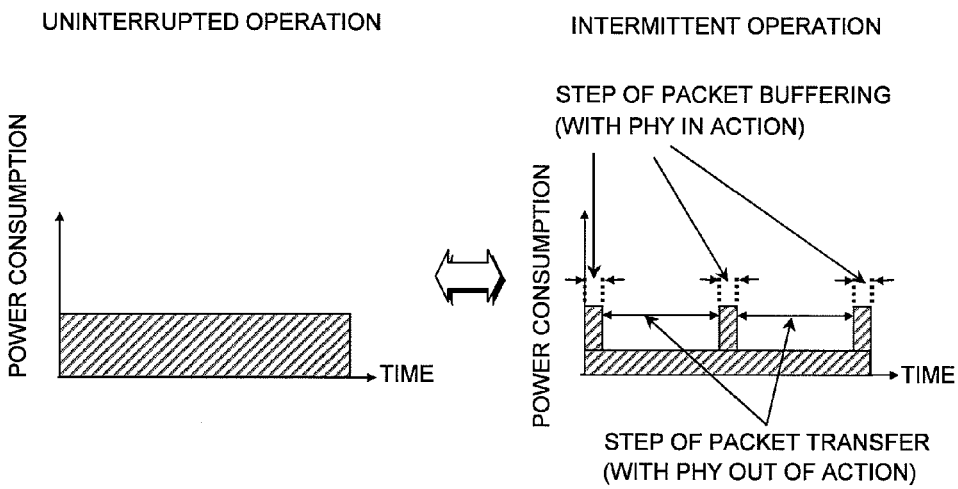
FIG. 2 is a diagram showing the difference between the uninterrupted-operation mode and intermittent-operation mode in the power consumption by the transceiver system 102 materialized by the semiconductor integrated circuit according to the first embodiment of the invention shown in FIG. 1.

FIG. 2 is a diagram showing the difference between the uninterrupted-operation mode and intermittent-operation mode in the power consumption by the transceiver system 102 materialized by the semiconductor integrated circuit according to the first embodiment of the invention shown in FIG. 1.

The left portion of FIG. 2 shows the power consumption in the uninterrupted-operation mode; the horizontal axis represents time, and the vertical axis represents the power consumption. As shown in the left portion of FIG. 2, the power consumption substantially becomes at a relatively large value in the uninterrupted-operation mode because the physical-layer transceiver (PHY) works uninterruptedly at all times.

On the other hand, the right portion of FIG. 2 shows the power consumption in the intermittent-operation mode; the horizontal axis represents time, and the vertical axis represents the power consumption.

As shown in the right portion of FIG. 2, the value of power consumption is relatively high during a packet-buffering time of the intermittent-operation mode because the physical-layer transceiver (PHY) is working, whereas during a packet-transferring time of the intermittent-operation mode, the power consumption has a small value because the physical-layer transceiver (PHY) is not working.

<<Application to a Building Management System>>

FIG. 3 is a diagram showing an example of the configuration of a building management system as an application of the transceiver system 102 formed by the semiconductor integrated circuit according to the first embodiment of the invention as shown in FIG. 1.

In the building management system shown in FIG. 3, the transmitters 101a, 101b and 101c are an air conditioning device, a monitoring camera and a security control device, respectively. The transmitter 101 including electronic devices like the air conditioning device 101a, monitoring camera 101b and security control device 101c is placed in each room on each floor of a building. The transmitter 101 placed in each room transmits e.g. air conditioning data, monitor image data, and safety management data of the room to a transceiver unit 102z of the transceiver system 102 through a branch network 104. Management data of the transceiver units 102z included in the transceiver system 102 are transmitted to a data server 103 of the building management system through an arterial network 105.

Figure 4:
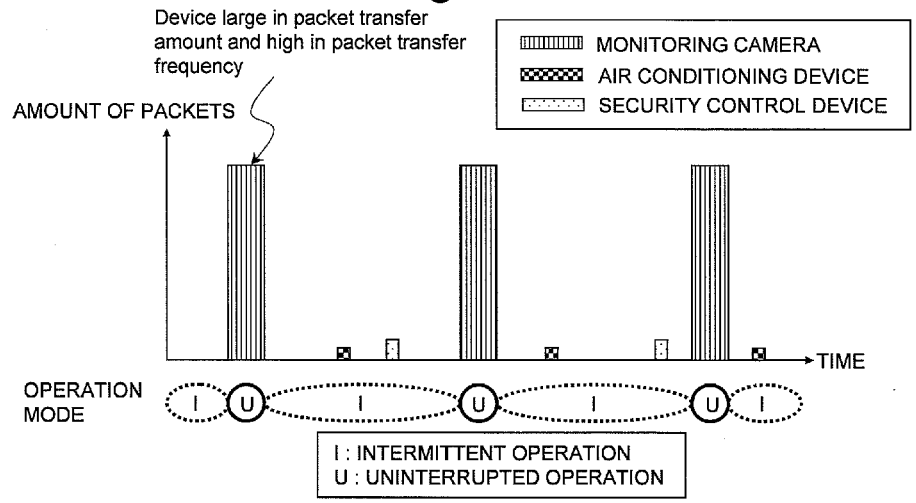
FIG. 4 is a diagram showing an amount of data transfer in the building management system as shown in FIG. 3, which is an application of the transceiver system 102 of a semiconductor integrated circuit according to the first embodiment of the invention as shown in FIG. 1, and showing how the uninterrupted-operation mode and the intermittent-operation mode are switched.

FIG. 4 is a diagram showing an amount of data transfer in the building management system shown in FIG. 3, which is an application of the transceiver system 102 formed by the semiconductor integrated circuit according to the first embodiment of the invention as shown in FIG. 1, and showing how the uninterrupted-operation mode and the intermittent-operation mode are switched.

As shown in FIG. 4, the monitoring camera 101b transmits a large amount of transmitted packet data because the monitoring camera 101b photographs inside the room and sends the resultant photographic image data at regular time intervals, whereas the air conditioning device 101a and the security control device 101c transmit a small amount of transmitted packet data. Specifically, what the air conditioning device 101a sends is numeric data such as the temperature and humidity of the room, and therefore the amount of packet data that the air conditioning device 101a transmits is small, and a period during which air conditioning device 101a keeps sending the packet data is short. When a person intends to enter the room and brings his or her authentication IC card into contact with a device for authentication, the security control device 101c is activated to send a number for authentication and identification of the authentication IC card. Therefore, the amount of packet data that the security control device 101c transmits is small and a period during which security control device 101c keeps sending the packet data is short.

Hence, the transceiver system 102 formed by the semiconductor integrated circuit according to the first embodiment of the invention is automatically set to one operation mode selected from among the uninterrupted-operation mode and the intermittent-operation mode. Particularly, the setting is made factoring in the significant difference between the air conditioning device 101a and the monitoring camera 101b and security control device 101c in the amount of transmitted packet data. Specifically, the transceiver system 102 according to the first embodiment of the invention identifies media access (MAC) addresses which have been previously allocated to the respective sender devices, i.e. the air conditioning device 101a, the monitoring camera 101b and the security control device 101c, and consequently automatically set its own operation mode.

In other words, for received packets from the monitoring camera 101b, the transceiver system 102 is automatically set to the uninterrupted-operation mode in which the transceiver system 102 executes the steps of receiving and processing packets uninterruptedly, whereas for received packets from the air conditioning device 101a and the security control device 101c, the transceiver system 102 is automatically set to the intermittent-operation mode in which the transceiver system 102 executes the steps of receiving and processing packets intermittently.

<<Structure of the Semiconductor Integrated Circuit>>

FIG. 5 is a diagram showing a structure of the semiconductor integrated circuit according to the first embodiment of the invention, which materializes the transceiver system 102 shown in FIG. 1.

As shown in FIG. 5, the transceiver system 102 includes: a physical-layer transceiver (PHY) 802, and a micro controller unit (MCU) 801. The physical-layer transceiver (PHY) 802 can be connected through a network to e.g. the air conditioning device 101a, monitoring camera 101b and security control device 101c of the transmitter 101 of the building management system shown in FIG. 3. The micro controller unit (MCU) 801 includes: a communication controller 803 having therein a media access controller (MAC); and a communication DMAC (Direct Memory Access Controller) 809. Specifically, the semiconductor chip of the physical-layer transceiver (PHY) 802 and the semiconductor chip of the micro controller unit (MCU) 801 are sealed into SIP (System-In-Package) by plastic sealing resin. Therefore, the transceiver system 102 is formed as a hybrid semiconductor integrated circuit in the form of a multichip module (MCM) including a plurality of semiconductor chips. Further, the transceiver system 102 is connected with an external memory 1217 included in a DRAM semiconductor chip such as a synchronous DRAM. Hence, the communication direct memory access controller (DMAC) 809 of the micro controller unit (MCU) 801 performs a memory transfer between the external memory 1217 included in the DRAM semiconductor chip and the communication controller 803.

Further, the micro controller unit 801 includes: a phase-locked loop (PLL) 804; a real-time clock (RTC) 805; a clock-pulse generator (CPG) 806; a central processing unit (CPU) 807; and an interrupt controller (INTO) 808. Moreover, the communication controller 803 further includes: a buffer memory 812; and a buffer control circuit 813. The buffer memory 812 is put under the control of the buffer control circuit 813, and buffers received packets, from which buffered packets are read out. Also, the buffer control circuit 813 produces a control signal 814 for stopping the supply of an operating-source voltage to the physical-layer transceiver 802. The buffer control circuit 813 stops the supply of the operating-source voltage to the physical-layer transceiver 802 during the time of packet transfer in the intermittent-operation mode, which the central processing unit 807, the communication direct memory access controller 809 and other components involve in.

<<Intermittent-Operation Mode, and Uninterrupted-Operation Mode>>

FIG. 6 is a table summarizing the features of the intermittent-operation mode and the uninterrupted-operation mode put into effect in the semiconductor integrated circuit according to the first embodiment of the invention shown in FIG. 5, which materializes the transceiver system 102 of FIG. 1.

As shown in FIG. 6, the intermittent-operation mode involves "Step of packet transfer", which is described in the upper portion of the row of the intermittent-operation mode, and "Step of packet buffering", which is described in the lower portion thereof. Specifically, in the intermittent-operation mode of FIG. 6, "Step of packet buffering" and "Step of packet transfer" are executed alternately.

In "Step of packet transfer" described in the upper portion of the row of the intermittent-operation mode, the output clock of the phase-locked loop 804 is set to a high frequency of 50 MHz for high-speed operation, whereas the output clock of the real-time clock 805 is set to a low frequency of 32 kHz for low-speed operation. In this condition, the central processing unit 807 and the communication direct memory access controller 809 execute the transfer of packet data buffered in the buffer memory 812 to the external memory 1217. During the transfer, the supply of the operating-source voltage to the physical-layer transceiver 802 is stopped according to the control signal 814 from the buffer control circuit 813, whereby the power consumption by the physical-layer transceiver 802 is reduced.

In "Step of packet buffering" described in the lower portion of the row of the intermittent-operation mode, the output clock of the phase-locked loop 804 is set to an intermediate frequency of 10 MHz for a middle-speed operation, whereas the output clock of the real-time clock 805 is set to a low frequency of 32 kHz for low-speed operation. In this condition, a module which does not have a task to execute, such as the central processing unit 807, is set to stay in its stopped condition, and the phase-locked loop 804 is decreased in the speed to the intermediate frequency of 10 MHz, whereby the power consumption is reduced. Also, in this condition, received packet data supplied through the network are passed to the physical-layer transceiver 802, and then buffered in the buffer memory 812 of the communication controller 803.

In the uninterrupted-operation mode described in the undermost row of the table of FIG. 6, the output clock of the phase-locked loop 804 is set to the high frequency of 50 MHz for high-speed operation, whereas the output clock of the real-time clock 805 is set to the low frequency of 32 kHz for low-speed operation. At this time, according to the control signal 814 from the buffer control circuit 813, the operating-source voltage is supplied to the physical-layer transceiver 802 to activate the physical-layer transceiver 802. Then, all the circuits of the transceiver system 102, i.e. the physical-layer transceiver (PHY) 802 and micro controller unit (MCU) 801 are put in action. As a result, received packet data supplied through the network are received by the physical-layer transceiver 802 and in parallel, the transfer of the packet data received by the physical-layer transceiver 802 to the external memory 1217 is executed with the aid of the central processing unit 807 and the communication direct memory access controller 809.

FIG. 7 is a diagram for explaining the way that the semiconductor integrated circuit according to the first embodiment of the invention, which is shown in FIG. 5, works in "packet transfer" in the intermittent-operation mode. In the example of FIG. 7, the supply of the operating-source voltage to the physical-layer transceiver 802 is stopped in "Step of packet transfer" in the intermittent-operation mode.

Figures 8, 12:
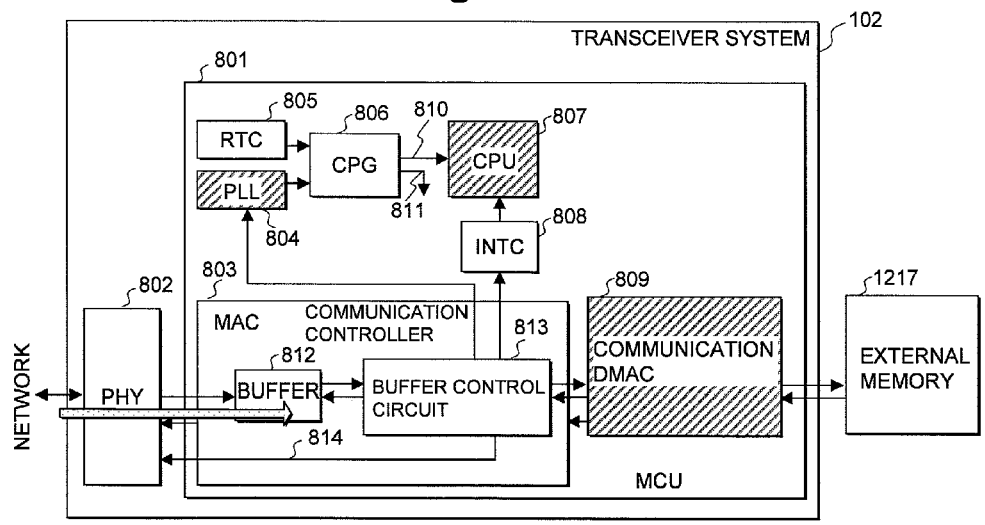
FIG. 8 is a diagram for explaining the way that the semiconductor integrated circuit according to the first embodiment of the invention, which is shown in FIG. 5, works in "packet buffering" in the intermittent-operation mode.
FIG. 12 is a table showing, for each of the air conditioning device 101a, the monitoring camera 101b, and the security control device 101c of the building management system shown in FIG. 3, the following data held in the registers in the communication controller 803 involved in the first embodiment of the invention shown in FIG. 9: (1) the setting data in the mode register 1321, (2) the setting data and (3) the transmit data size, both in the MAC-address-setting register 1314, (4) the set packet buffering time in the packet-buffering-period-setting register 1322, (5) the set downtime in the physical-layer-transceiver-downtime-setting register 1323, and (6) the set buffering amount threshold in the packet-buffering-amount-threshold-setting register 1331.

FIG. 8 is a diagram for explaining the way that the semiconductor integrated circuit according to the first embodiment of the invention, which is shown in FIG. 5, works in "packet buffering" in the intermittent-operation mode. In the example of FIG. 8, in "Step of packet buffering" in the intermittent-operation mode, the phase-locked loop 804 is decreased in speed to the intermediate frequency of 10 MHz, and its power consumption is reduced. Further, the central processing unit 807 and the communication direct memory access controller 809 are set to be in the stopped condition.

<<Detailed Structure of the Semiconductor Integrated Circuit>>

FIG. 9 is a diagram showing the structure of the semiconductor integrated circuit according to the first embodiment of the invention shown in FIG. 5 further in detail.

Especially, as to the micro controller unit 801 of the semiconductor integrated circuit shown in FIG. 9, the details of the internal structures of the communication controller 803, communication direct memory access controller 809, and peripheral module 1220 are illustrated.

As shown in FIG. 9, the micro controller unit 801 includes a port 1203 which is connected with the physical-layer transceiver 802 so as to allow a bidirectional communication therebetween. The communication controller 803 further includes: an RMII interface 1204, which is connected with the port 1203 so as to allow a bidirectional communication therebetween; a media access controller (MAC) 1206; and a communication direct memory access controller interface (DMAC I/F) 1209. The media access controller (MAC) 1206 includes: a MII interface 1205; a buffer memory 812; a buffer control circuit 813; a receive controller 1207; and a transmit controller 1208. Incidentally, MII and RMII are abbreviations for "Media Independent Interface" and "Reduced Media Independent Interface" for an Ethernet MAC compliant with the IEEE 802.3 standard, respectively. Particularly, RMII is a specification prepared for the purpose of reducing MII signal lines.

The communication direct memory access controller 809 includes: a receive FIFO memory 1210; a transmit FIFO memory 1212; a descriptor-receive DMAC 1211; a descriptor-transmit DMAC 1213; an internal bus interface 1214; an internal bus 1215; and an external bus interface 1216.

Further, the peripheral module 1220 includes: a serial communication interface SCI; a controller area network CAN; a power-on reset POR; a universal serial bus interface USB; a read only memory ROM; a communication direct memory access controller DMAC; a watch dog timer WDT; a random access memory RAM; and a data transfer controller DTC.

<<Reception of Received Packets>>

If the physical-layer transceiver 802 is in action, the physical-layer transceiver 802 receives a packet in response to a packet transfer request from the transceiver system 101. Then, the received packet thus received is supplied to the RMII interface 1204 and MII interface 1205 of the communication controller 803 through the port 1203. The received packet is temporarily buffered in the buffer memory 812 controlled by the buffer control circuit 813, and passed through the receive controller 1207 and communication direct memory access controller interface (DMAC I/F) 1209 of the subsequent steps, and then transferred to the communication direct memory access controller 809. In the communication direct memory access controller 809, the received packet is temporarily buffered in the receive FIFO memory 1210. After that, according to receive descriptor data contained in the receive descriptor 1218 of the external memory 1217, the descriptor-receive DMAC 1211 executes DMAC transfer of the received packet to the external memory 1217 through the internal bus interface 1214, the internal bus 1215, and the external bus interface 1216. Further, as already described, in "Step of packet transfer" in the intermittent-operation mode executed with the aid of the central processing unit 807 and the communication direct memory access controller 809, the supply of the operating-source voltage to the physical-layer transceiver 802 is stopped according to the control signal 814 produced by the buffer control circuit 813. On the other hand, the external device supplies the buffer control circuit 813 with at least one of two emergency uninterrupted setting signals 1201 and 1202 for forcibly setting the operation mode of the transceiver system 102 to the uninterrupted-operation mode in case of emergency. The emergency uninterrupted setting signal 1201 changes the value of the mode register 1321 to reflect a value for setting the operation mode to the uninterrupted-operation mode. Until the value of the mode register 1321 is updated into a value for setting the operation mode to the intermittent-operation mode, the operation mode is unchanged remaining the uninterrupted-operation mode. In contrast, the emergency uninterrupted setting signal 1202 is a signal supplied by the external device, which is directly provided to the buffer control circuit 813. In response to the control signal from the external device, the buffer control circuit 813 switches between the uninterrupted-operation mode, and the intermittent-operation mode. As described above, which of the two emergency uninterrupted setting signals 1201 and 1202 will be supplied from the external device is decided according to the feature of the control signal formed by the external device.

<<Sending of Transmitted Packets>>

In the building management system as shown in FIG. 3, a transmitted packet is sent to the data server 103 along a route reverse, in direction, to a receive route for received packets as described above. Specifically, according to transmit descriptor data described in the transmit descriptor 1219 stored in the external memory 1217, the descriptor-transmit DMAC 1213 of the communication direct memory access controller 809 performs DMAC transfer of a transmitted packet from the external memory 1217 to the communication controller 803 through the external bus interface 1216, the internal bus 1215, the internal bus interface 1214, and the transmit FIFO memory 1212.

A transmitted packet received by the communication direct memory access controller interface 1209 of the communication controller 803 is supplied to the port 1203 through the transmit controller 1208, and the MII interface 1205. Thereafter, the transmitted packet is sent to the data server 103 by the physical-layer transceiver 802 in service.

It is noted that the transmit route for transmitted packets in the micro controller unit 801 of the semiconductor integrated circuit according to the first embodiment of the invention shown in FIG. 9 does not include circuits corresponding to the buffer memory 812 and the buffer control circuit 813. Therefore, the transmit operation of the transceiver system is executed in line with the timing of transmission by the transmit controller 1208 of the communication controller 803.

<<Buffer Memory and Buffer Control Circuit>>

FIG. 10 is a diagram showing a circuit configuration of the buffer memory 812, buffer control circuit 813, and others included in the communication controller 803 of the micro controller unit 801 of the transceiver system 102 associated with the first embodiment of the invention and shown in FIG. 9.

As shown in FIG. 10, the buffer memory 812 includes two kinds of buffer memories, i.e. a buffer 1302 for operation mode judgment and a buffer 1303 for packet buffering. A received packet 1332 supplied through the MII interface 1205 is first provided to the packet-header-judging circuit 1315, whereby the judgment of the operation mode is performed. According to the result of the judgment of the operation mode, the transceiver system 102 is automatically set to an operation mode selected from among the uninterrupted-operation mode and the intermittent-operation mode.

To make the setting of the operation mode, a system user previously decides which of the transmitters 101*a*, 101*b* and 101*c* included in the building management system shown in FIG. 3 be made a source of received packets to put the uninterrupted-operation mode into effect for. After the decision, the MAC (Media Access Control) address of the transmitter, which is decided as a source of received packets to put the uninterrupted-operation mode into effect for, is set in the MAC-address-setting register 1314.

Therefore, the packet-header-judging circuit 1315 compares the transmitter MAC address included in the packet header of a received packet with the uninterrupted-operation-mode MAC address set in the MAC-address-setting register 1314. As a result of the comparison, if the transmitter MAC address matches the uninterrupted-operation-mode MAC address, the operation mode data 1334 containing information of the uninterrupted-operation mode is prepared. On receipt of the operation mode data 1334 containing the information of the uninterrupted-operation mode, the buffer control circuit 813 judges the operation mode to be the uninterrupted-operation mode, and sets the select signal 1335 to send to the input selector 1304 to the uninterrupted-operation mode. Consequently, the input selector 1304 selects a bypass route 1306 running between the input selector 1304 and the output selector 1305 in response to the select signal 1335 set to the uninterrupted-operation mode. Therefore, the received packet 1332, which has been supplied to the packet-header-judging circuit 1315 through the MII interface 1205, is directly output from the input selector 1304 to the output selector 1305 through the bypass route 1306 without being buffered into the buffer memories, i.e. the buffer 1302 for operation mode judgment, and the buffer 1303 for packet buffering. The timing of termination of the uninterrupted-operation mode is coincident with the timing of when the data size of a received packet going through the buffer memory 812 exceeds a threshold set in the uninterrupted-operation-buffered-data-size-threshold-setting register 1340 on condition that the buffer control circuit 813 compares the data size of a received packet going through the buffer memory 812 with the threshold set in the register 1340.

Another requirement for setting the transceiver system 102 to the uninterrupted-operation mode is that the setting on the mode register 1321 is performed by the emergency uninterrupted setting signal 1201 from the central processing unit 807 or the external device.

On the other hand, if the mismatch between the addresses is found from the comparison between the transmitter MAC address and the uninterrupted-operation-mode MAC address, which was made by the packet-header-judging circuit 1315, the operation mode data 1334 containing the information of the intermittent-operation mode is prepared. On receipt of the operation mode data 1334 containing the information of the intermittent-operation mode, the buffer control circuit 813 judges the operation mode to be the intermittent-operation mode, and sets the select signal 1335 to send to the input selector 1304 to the intermittent-operation mode. Consequently, the input selector 1304 selects an operation-mode-automatically-discriminating route 1336 in response to the select signal 1335 set to the intermittent-operation mode. Accordingly, the received packet is supplied to the buffer 1302 for operation mode judgment through the operation-mode-automatically-discriminating route 1336 selected by the input selector 1304. Then, the buffer 1302 for operation mode judgment temporarily holds a received packet in order to automatically discriminate between the uninterrupted-operation mode and the intermittent-operation mode by using, as a measure, the value of the packet rate of the received packet. On the other hand, the buffer control circuit 813 reads out a set threshold 1330 set in the packet-rate-threshold-setting register 1329, and compares the packet rate of a received packet supplied to the buffer 1302 for operation mode judgment with the set threshold 1330. In case that the packet rate of the received packet exceeds the set threshold 1330, the buffer control circuit 813 judges the operation mode to be the uninterrupted-operation mode. However, in case that the packet rate of the received packet is below the set threshold 1330, the buffer control circuit 813 judges the operation mode to be the intermittent-operation mode.

In the case of the operation mode judged to be the uninterrupted-operation mode by the buffer control circuit 813, the received packet is subjected to delay by the buffer 1302 for operation mode judgment, conveyed along a route 1307, and then output to the output selector 1305. However, in the case of the operation mode judged to be the intermittent-operation mode by the buffer control circuit 813, a packet-buffering-input route 1337 is selected according to the select signal 1335. In this case, the received packet is conveyed along the packet-buffering-input route 1337, and buffered in the buffer 1303 for packet buffering from its leading portion in turn. The timing of completion of the received packet buffering on the buffer 1303 for packet buffering is decided by the buffer control circuit 813. Specifically, the buffer control circuit 813 uses a packet-buffering-period-setting register 1322, and a packet-buffering-amount-threshold-setting register 1331 to create the timing of completion of buffering on the buffer 1303 for packet buffering.

The first time of completion of buffering on the buffer 1303 for packet buffering represents the maximum time for which the received packet can be buffered. According to the period which a user has specified on the packet-buffering-period-setting register 1322, the packet-buffering-time-measuring timer 1326 measures time. The buffer control circuit 813 makes the packet-buffering-time-measuring timer 1326 start counting down from the time of the beginning of supply of the received packet to the buffer 1303 for packet buffering. At the time when the value of the packet-buffering-time-measuring timer 1326 reaches zero after the start of the countdown, the buffer control circuit 813 supplies a stop signal 1316 (control signal 814) to the physical-layer transceiver 802 for the purpose of stopping the physical-layer transceiver 802 from buffering received packets on the buffer 1303 for packet buffering.

The second time of completion of buffering on the buffer 1303 for packet buffering depends on the maximum amount of received packets which can be buffered in the buffer 1303 for packet buffering. When the size of received packets buffered in the buffer 1303 for packet buffering exceeds the threshold set in the packet-buffering-amount-threshold-setting register 1331, the buffer control circuit 813 supplies the physical-layer transceiver 802 with the stop signal 1316 (control signal 814) for the purpose of stopping the physical-layer transceiver 802 from buffering received packets on the buffer 1303 for packet buffering.

As the transceiver system 102 is set to the intermittent-operation mode, in a packet-buffering period during which received packets are buffered in the buffer 1302 for operation mode judgment of the buffer memory 812 or the buffer 1303 for packet buffering thereof, the buffer control circuit 813 produces a CPU-stop signal 1338 for stopping the central processing unit 807 and a clock-slowdown signal 1339 for notifying the slowdown of clocks generated by the clock-pulse generator 806, and thus the reduction in power consumption is achieved. After completion of the period of "Step of packet buffering", the transceiver system goes to "Step of packet transfer", an interrupt signal 1317 to the central processing unit 807 causes the central processing unit 807 to start working, and then the output clock of the phase-locked loop 804 is speeded up to the frequency of 50 MHz for high-speed operation. By using the physical-layer-transceiver-downtime-measuring timer 1327 to measure the downtime set in the physical-layer-transceiver-downtime-setting register 1323, the stop signal 1316 (control signal 814) is kept supplied to the physical-layer transceiver 802 at least during the downtime, and "Step of packet transfer" is executed with the physical-layer transceiver 802 stopped.

<<Operation Flow>>

Figure 11:
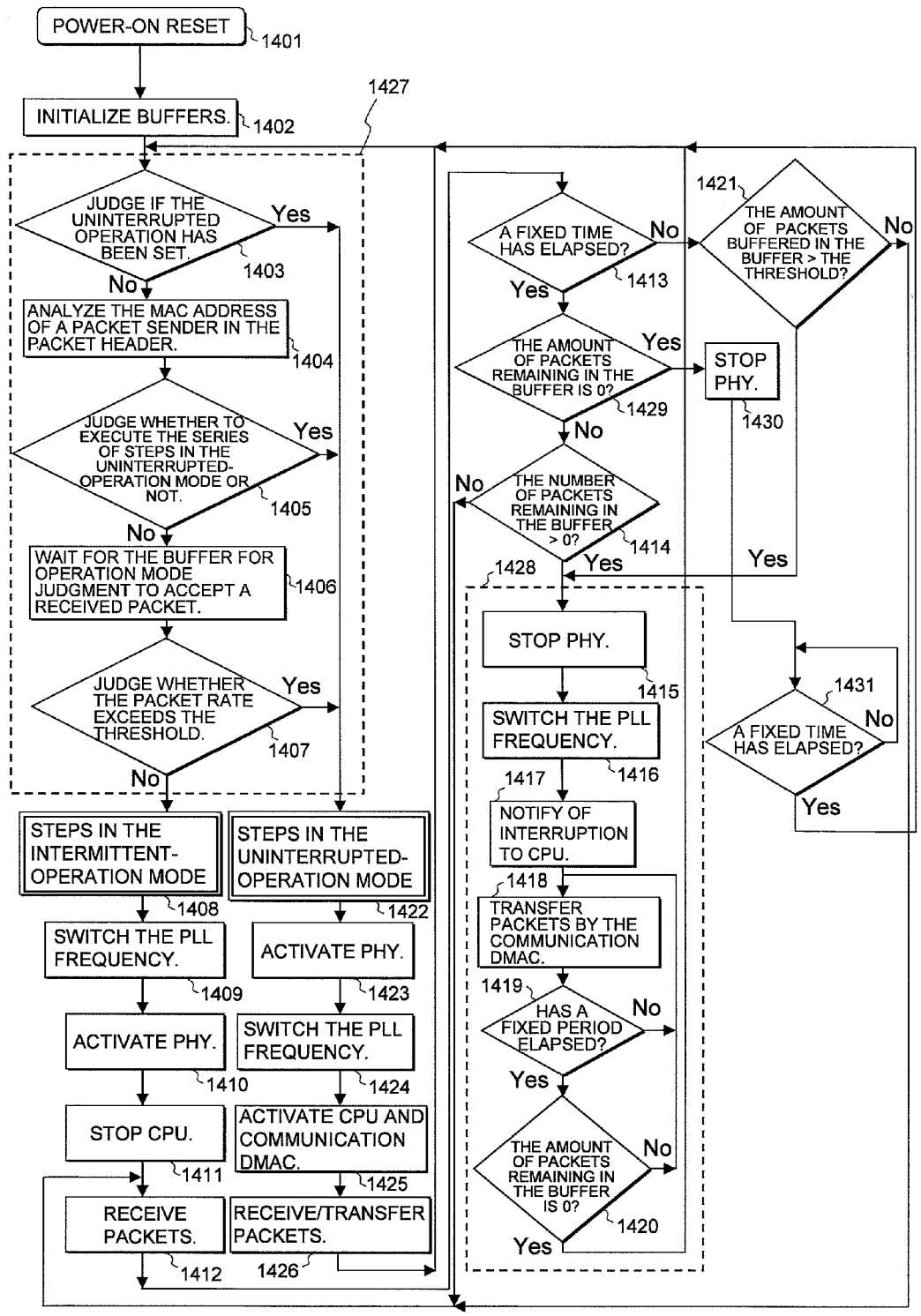
FIG. 11 is a flow chart showing the operation flow of the semiconductor integrated circuit according to the first embodiment of the invention which materializes the transceiver system 102 described with reference to FIGS. 5 to 10.

FIG. 11 is a flow chart showing the operation flow of the semiconductor integrated circuit according to the first embodiment of the invention which materializes the transceiver system 102 described with reference to FIGS. 5 to 10.

As shown in FIG. 11, after the power-on reset step 1401, the step 1402 of initializing the buffers of the buffer memory 812 is executed, and then the execution of the operation is moved to the series of steps 1427 involved with the operation mode judgment.

In the step 1403 of judgment on uninterrupted operation setting included in the series of steps 1427 involved with the operation mode judgment, if the uninterrupted-operation mode has been set in the mode register 1321 by the central processing unit 807 or the external device, the execution of the operation is moved to a series of steps 1422 in the uninterrupted-operation mode.

If the result of the judgment in the step 1403 is "No", the packet-header-judging circuit 1315 analyzes the transmitter MAC address included in the packet header of a received packet in the analyzing step 1404. Subsequently, in the judging step 1405, the packet-header-judging circuit 1315 makes a judgment about whether or not the transmitter MAC address—obtained as a result of the analysis in the analyzing step 1404—agrees with the uninterrupted-operation-mode MAC address. If the result of the judgment in the step 1405 is "Yes", the execution of the operation is moved to the series of steps 1422 in the uninterrupted-operation mode.

If the result of the judgment in the step 1405 is "No", the execution of the operation is moved to the step 1406, where it waits for the buffer 1302 for operation mode judgment to accept a received packet. Subsequently, in the step 1407 of packet rate judgment, the buffer control circuit 813 makes a judgment about whether or not the packet rate of the received packet accepted by the buffer 1302 in the step 1406 exceeds the set threshold 1330 set in the packet-rate-threshold-setting register 1329. If the result of the judgment in the step 1407 is "Yes", the execution of the operation is moved to the series of steps 1422 in the uninterrupted-operation mode.

<<Steps in the Uninterrupted-Operation Mode>>

In case that the execution of the operation is moved to the series of steps 1422 in the uninterrupted-operation mode, in the step 1423 involved with the transceiver operation, the physical-layer transceiver 802 is activated. Then, in the step 1424 of switching the PLL frequency, the output clock of the phase-locked loop 804 is speeded up to the high frequency of 50 MHz. In the step 1425 involved with operations of the CPU and communication DMAC, the central processing unit 807 and communication direct memory access controller 809 are activated. In the step 1426 involved with the packet receive and packet transfer, the receive of a received packet by the physical-layer transceiver 802, and the packet transfer by the communication DMAC 809 are executed, and then the transceiver system 102 goes into a state where it waits for the finish of the packet receive and transfer. After the finish of the operation of processing in the step 1426 involved with the packet receive and packet transfer, the execution of the operation is returned back to the series of steps 1427 involved with the operation mode judgment, and the preparation to handle the subsequent received packet is made. Now, it is noted that in the step 1426, e.g. a frame of image transmitted by the monitoring camera 101*b* of the building management system described with reference to FIG. 3, which will be supplied through the MII interface 1205, is received, and then the packet transfer by the central processing unit 807 and the communication DMAC 809 is completed.

As described above, in the steps 1422 to 1426 in the uninterrupted-operation mode, the physical-layer transceiver 802 receives received packet data from a network, and in parallel, the combination of the central processing unit 807 and the communication DMAC 809 makes the physical-layer transceiver 802 transfer received packet data to the external memory 1217.

<<Steps in the Intermittent-Operation Mode>>

If the result of the judgment in the step 1407 of packet rate judgment is "No", the execution of the operation is moved to a series of steps 1408 in the intermittent-operation mode. In case that the execution of the operation is moved to the series of steps 1408 in the intermittent-operation mode, in the step 1409 of switching the PLL frequency, the output clock of the phase-locked loop 804 is slowed down, in frequency, to the intermediate frequency of 10 MHz.

In the subsequent step 1410 involved with the transceiver operation, the physical-layer transceiver 802 is activated. Further, in the step 1411 of stopping CPU, the operation of the central processing unit 807 is stopped according to the CPU-stop signal 1338 from the buffer control circuit 813. In the subsequent step 1412 of receiving a packet, the physical-layer transceiver 802 is brought to a condition where it can receive a received packet.

After that, in the step 1413 of judging the elapse of a fixed period of time, the packet-buffering-time-measuring timer 1326 performs a judgment about whether or not a fixed period of time has elapsed. If the result of the judgment in the step 1413 is "Yes", the execution of the operation is moved to the step 1429 of checking the buffer buffering amount. In the step 1429, it is checked whether or not the buffering amount of received packets buffered in the buffer memory 812 is zero.

In case that it is confirmed in the step 1429 that the amount of received packets buffered in the buffer memory 812 is zero, there will be no received packet to be packet-transferred by the communication DMAC 809 in a series of later steps 1428. Therefore, in this case, the physical-layer transceiver 802 is stopped from working in the step 1430 of stopping the transceiver, followed by the step 1431 of judging the elapse of a fixed period of time. After that, the execution of the operation is returned back to the series of steps 1427 involved with the operation mode judgment, and a preparation for the processing of the subsequent received packet is made.

After it has been confirmed, in the step 1429 of checking the buffer buffering amount, that the amount of received packets buffered in the buffer memory 812 is not zero, a check is made on whether the number of received packets buffered in the buffer memory 812 is larger than zero or not, in the subsequent step 1414.

Basically, the amount of packets buffered in the buffer memory 812 is handled in packets. Hence, in case that a value larger than zero is not confirmed as the amount of received packets buffered in the buffer memory 812 in the step 1414, the amount of received packets buffered in the buffer memory 812 is insufficient, and therefore the execution of the operation is returned back to the step 1412 of receiving a packet in order to increase the amount of the buffered packets. In contrast, in case that a value larger than zero is confirmed as the number of received packets buffered in the buffer memory 812 in the step 1414, the execution of the operation is moved to the series of steps 1428 involved with packet transfer.

If the result of the judgment in step 1413 of judging elapse of a fixed period is "No", it is checked in the step 1421 whether or not the amount of received packets buffered in the buffer memory 812 is larger than the threshold set in the packet-buffering-amount-threshold-setting register 1331.

If a value larger than the threshold set in the packet-buffering-amount-threshold-setting register 1331 is not confirmed as the amount of received packets buffered in the buffer memory 812 in the step 1421, the buffer memory 812 can further accept a packet, and therefore the execution of the operation is returned back to the step 1412 of receiving a packet. However, if a value larger than the threshold set in the packet-buffering-amount-threshold-setting register 1331 is confirmed as the amount of received packets buffered in the buffer memory 812 in the step 1421, the execution of the operation is moved to the series of steps 1428 involved with packet transfer. Unlike the judgment in the step 1414, even though the amount of packets buffered in the buffer memory 812 is not in packets in the step 1421, the execution of the operation is moved to the subsequent step after the judgment. Incidentally, if the result of the judgment in the step 1421 is "Yes", the execution of the operation is moved to the series of steps 1428 which are for preventing the overflow of the buffer memory 812.

In the series of steps 1428 involved with packet transfer, the physical-layer transceiver 802 is stopped from working the step 1415 of stopping the transceiver, and then in the step 1416 of switching the PLL frequency, the output clock of the phase-locked loop 804 is speeded up to the high frequency of 50 MHz. In the subsequent step 1417 involved with notification of CPU interruption, the central processing unit 807 is activated to execute the notification of the interruption. Then, the central processing unit 807 activates the communication direct memory access controller 809. As a result, in the step 1418 of packet transfer by the communication DMAC, the communication DMAC 809 transfers packets.

If it is judged in the step 1419 of judging elapse of a fixed period that a fixed downtime set in the physical-layer-transceiver-downtime-setting register 1323 has not elapsed, the execution of the operation is returned back to the step 1418 of packet transfer by the communication DMAC. If the fixed down time has elapsed, in the step 1420 of checking the amount of packets remaining in the buffer, the communication DMAC 809 transfers no packet, and it is checked whether the remaining amount of received packets remaining in the buffer memory 812 is zero.

If it is confirmed in the step 1420 that the remaining amount of received packets remaining in the buffer memory 812 is not zero, the execution of the operation is returned back to the step 1418 of packet transfer by the communication DMAC for the purpose of reducing the remaining amount to zero. On the other hand, after it is confirmed in the step 1420 that the remaining amount of received packets remaining in the buffer memory 812 is zero, the series of steps 1428 involved with packet transfer are completed. Then, the execution of the operation is returned back to the series of steps 1427 involved with the operation mode judgment, and a preparation for the processing of the subsequent received packet is made.

<<Settings of the Registers in the Communication Controller>>

FIG. 12 is a table showing, for each of the air conditioning device 101a, the monitoring camera 101b, and the security control device 101c of the building management system shown in FIG. 3, the following data held in the registers in the communication controller 803 involved in the first embodiment of the invention shown in FIG. 9: (1) the setting data in the mode register 1321, (2) the setting data and (3) the transmitted data size, both in the MAC-address-setting register 1314, (4) the set packet buffering time in the packet-buffering-period-setting register 1322, (5) the set downtime in the physical-layer-transceiver-downtime-setting register 1323, and (6) the set buffering amount threshold in the packet-buffering-amount-threshold-setting register 1331.

As shown in the table of FIG. 12, for all the air conditioning device 101a, the monitoring camera 101b, and the security control device 101c, which operation mode of the intermittent-operation mode and the uninterrupted-operation mode to select is set as "Automatically selected" by the setting data of the mode register 1321.

Therefore, the result of the judgment in the step 1403 of uninterrupted operation setting judgment, which has been described with reference to FIG. 11, is "No", and whether or not each transmitter MAC address agrees with the uninterrupted-operation-mode MAC address is judged by the analyzing step 1404 and the judging step 1405. As shown by the table of FIG. 12, no uninterrupted-operation-mode MAC address has been set as to the air conditioning device 101a and the security control device 101c, whereas the uninterrupted-operation-mode MAC address has been set concerning the monitoring camera 101b. Hence, in regard to the monitoring camera 101b, the execution of the operation is moved to the series of steps 1422 in the uninterrupted-operation mode after the analyzing step 1404 and the judging step 1405.

As shown in the table of FIG. 12, the data sizes in the air conditioning device 101a, the monitoring camera 101b, and the security control device 101c are set to 128, 76800, and 256 bytes, respectively.

Because the data size in the monitoring camera 101b is as large as 76800 bytes as described above, a frame of image data of the monitoring camera 101b is divided into a plurality of packets and then transmitted.

In contrast, as to data of the air conditioning device 101a and the security control device 101c, both involving small data sizes, the execution of the operation is moved to the step 1407 of packet rate judgment in the operation flow described with reference to FIG. 11. The sizes of data of the air conditioning device 101a and the security control device 101c are small and never exceed the set threshold 1330 set in the packet-rate-threshold-setting register 1329, and therefore the execution of the operation is moved to the series of steps 1408 in the intermittent-operation mode.

As shown in the table of FIG. 12, for all the air conditioning device 101a, the monitoring camera 101b, and the security control device 101c, the set packet buffering time in the packet-buffering-period-setting register 1322 is set to 100 µs, the set downtime in the physical-layer-transceiver-downtime-setting register 1323 is set to 1 millisecond, and the set buffering amount threshold in the packet-buffering-amount-threshold-setting register 1331 is set to 2 kilobytes.

<<Operation of Receiving a Packet in the Building Management System>>

FIG. 13 is a diagram for explaining the operation by the semiconductor integrated circuit according to the first embodiment of the invention, which materializes the transceiver system 102 as described with reference to FIGS. 1 to 12, when receiving packets transmitted by the air conditioning device 101a, the monitoring camera 101b, and the security control device 101c of the building management system shown in FIG. 3.

In FIG. 13, at Time 0, the operation mode is set to the intermittent-operation mode, and the physical-layer transceiver (PHY) 802 put in its stopped condition. At Time T1 after the elapse of a physical-layer downtime of 1 millisecond, the physical-layer transceiver is receiving a packet transmitted by the monitoring camera 101b, whose MAC address has been set in the MAC-address-setting register 1314 as the uninterrupted-operation MAC address, and therefore the operation mode is the uninterrupted-operation mode, and the physical-layer transceiver (PHY) 802 stays in action. At Time T1', the physical-layer transceiver is receiving a packet transmitted by the security control device 101c, whose MAC address has not been set in the MAC-address-setting register 1314 as the uninterrupted-operation MAC address, and data from which have not been targeted for processing in the uninterrupted-operation mode. The physical-layer transceiver is left in the uninterrupted-operation mode without moving to the intermittent-operation mode until the transceiver system 102 finishes receiving a frame of image data transmitted by the monitoring camera 101b. Further, the physical-layer transceiver can receive the subsequent packet during the set packet buffering time of 100 µs after the completion of the operation of receiving the first frame of image data from the monitoring camera 101b. Therefore, the physical-layer transceiver (PHY) 802 remains working until finishing receiving a packet transmitted by the air conditioning device 101a.

At Time T2, the physical-layer transceiver is receiving a packet transmitted by the air conditioning device 101a, whose MAC address has not been set in the MAC-address-setting register 1314 as the uninterrupted-operation MAC address, and data from which have not been targeted for processing in the uninterrupted-operation mode. Therefore, the operation mode is the intermittent-operation mode, and the physical-layer transceiver (PHY) 802 stays in action during the packet-buffering period. For the subsequent period, during which the communication DMAC 809 is transferring packets, the physical-layer transceiver (PHY) 802 is kept stopped. After the physical-layer downtime of 1 millisecond has elapsed, the physical-layer transceiver (PHY) 802 is in action during the period of the set packet buffering time of 100 µs set in the packet-buffering-period-setting register 1322. During the time of 100 µs, the physical-layer transceiver (PHY) 802 does not receive a packet transmitted thereto. For the subsequent physical-layer downtime of 1 millisecond, the physical-layer transceiver (PHY) 802 is kept stopped.

At Time T3, the physical-layer transceiver is receiving a packet transmitted by the security control device 101c, whose MAC address has not been set in the MAC-address-setting register 1314 as the uninterrupted-operation MAC address, and data from which have not been targeted for processing in the uninterrupted-operation mode, and therefore the operation mode is the intermittent-operation mode. However, as the physical-layer transceiver (PHY) 802 remains stopped at Time T3, the reception of a packet transmitted thereto is delayed to the Time T3'. Hence, for a period of the set packet buffering time of 100 µs since the delayed time T3', the physical-layer transceiver (PHY) 802 receives a packet transmitted thereto. After that, the physical-layer transceiver (PHY) 802 is kept stopped for the physical-layer downtime of 1 millisecond.

At Time T4 during the period of the set packet buffering time of 100 µs after the elapse of the physical-layer downtime of 1 millisecond, a packet transmitted by the security control device 101c is received because the physical-layer transceiver (PHY) 802 is in action. After the completion of reception of the packet, the physical-layer transceiver (PHY) 802 is kept stopped for the physical-layer downtime of 1 millisecond. At Time T5 during this 1-millisecond operation downtime, the monitoring camera 101b is sending a packet, however the time T5 is included in the operation downtime of the physical-layer transceiver (PHY) 802. Therefore, the monitoring camera 101b executes the retransmission of a packet, and waits for the physical-layer transceiver to receive the retransmitted packet. At Time T5' after the 1-millisecond operation downtime, the physical-layer transceiver (PHY) 802 starts receiving a packet transmitted by the monitoring camera 101b, in the uninterrupted-operation mode. After the completion of the reception of a frame of image data from the monitoring camera 101b, the operation mode is switched from the uninterrupted-operation mode to the intermittent-operation mode.

At Time T6 during the 1-millisecond operation downtime after that the air conditioning device 101a is transmitting a packet, however the time T6 is included in the operation downtime of the physical-layer transceiver (PHY) 802. Therefore, the air conditioning device 101a executes the retransmission of a packet, and waits for the physical-layer transceiver to receive the retransmitted packet. At Time T6' after the elapse of the 1-millisecond operation downtime, the operation of receiving a packet transmitted by the air conditioning device 101a is started in the intermittent-operation mode. During the 1-millisecond physical-layer downtime of the physical-layer transceiver (PHY) 802 after the elapse of the set packet buffering time of 100 µs, the communication DMAC 809 executes the step of packet transfer.

<<Received Packet Rate>>

As described with reference to FIG. 10, the buffer 1302 for operation mode judgment temporarily holds a received packet in order to automatically discriminate between the uninterrupted-operation mode and the intermittent-operation mode based on the packet rate of a received packet. On the other hand, the buffer control circuit 813 reads out the set threshold 1330 set in the packet-rate-threshold-setting register 1329, and compares the received packet rate of the buffer 1302 for operation mode judgment with the set threshold 1330. In the case of the received packet's rate above the set threshold 1330, the buffer control circuit 813 judges the operation mode to be the uninterrupted-operation mode. However, in the case of the received packet's rate below the set threshold 1330, the buffer control circuit 813 judges the operation mode to be the intermittent-operation mode.

FIG. 14 is a diagram showing the change in the packet rate of a received packet supplied to the buffer 1302 for operation mode judgment shown in FIG. 10 with respect to time.

In the example of FIG. 14, it is assumed that the buffer 1302 for operation mode judgment is supplied with a received packet for a period between T0 and T1 inclusive. In case that the amount of received packets supplied during the supply period from T0 to T1 is above a given packet amount threshold X, the operation mode is judged to be the uninterrupted-operation mode automatically. However, incase that the amount of received packets supplied during the supply period is below the given packet amount threshold X, the operation mode is judged to be the intermittent-operation mode automatically. Now, it is noted that the given packet amount threshold X is the set threshold 1330 which has been set in the packet-rate-threshold-setting register 1329. In the example of FIG. 14, the amount of received packets to compare with the packet amount threshold X corresponds to the area of the shaded portion.

<<Packet-Rate-Threshold-Setting Register>>

FIG. 15 is a diagram showing an example of the set threshold 1330 set in the packet-rate-threshold-setting register 1329 shown in FIG. 10 in order to judge the received packet rate which has been described with reference to FIG. 14.

As shown in FIG. 15, the interval of the measurement T1-T0 is set to 120 µs, and the packet amount threshold X is set to 1500 bytes. The value shown in FIG. 15 is based on the condition that a transmitted packet is transferred at a communication speed of 100 Mbps for a supply period of 120 µs according to the Ethernet standard without an interruption by a linked partner.

As to the example of the received packet rate described with reference to FIG. 14, the buffer 1302 for operation mode judgment is steadily supplied with a transmitted packet at the maximum communication rate. In other words, in this case, the buffer control circuit 813 shown in FIG. 10 judges the operation mode to be the uninterrupted-operation mode automatically.

<<Automatic Judgment of the Operation Mode>>

In regard to the semiconductor integrated circuit according to the first embodiment of the invention as described with reference to FIGS. 1 to 15, the buffer control circuit 813 automatically judges the operation mode the uninterrupted-operation mode if a transmitter MAC address included in the packet header of a received packet supplied to the packet-header-judging circuit 1315 matches with the uninterrupted-operation-mode MAC address in the MAC-address-setting register 1314, otherwise the intermittent-operation mode. Besides, even after the operation mode has been judged to be the intermittent-operation mode because of the address mismatch, in case that the packet rate of a received packet supplied to the buffer 1302 for operation mode judgment is above the set threshold 1330 set in the packet-rate-threshold-setting register 1329, the operation mode is automatically judged to be the uninterrupted-operation mode.

The automatic judgment of the operation mode as described above is based on the step 1405 of MAC address judgment and the step 1407 of packet rate judgment, which are included in the operation flow with reference to FIG. 11.

<<Uninterrupted-Operation Mode in Case of Emergency>>

As described with reference to FIG. 9, in case of emergency, the emergency uninterrupted setting signal 1202 for forcibly setting the operation mode of the transceiver system 102 to the uninterrupted-operation mode is provided to the buffer control circuit 813 from the external device. Consequently, the input selector 1304 connected with the buffer memory 812 selects the bypass route 1306, and a received packet 1332 supplied through the MII interface 1205 is directly output to the output selector 1305 without being buffered into the buffers 1302 and 1303.

FIG. 16 is a diagram showing the transition of the operation mode of the transceiver system 102 and the change in the situation involved with it during the receive operation by the transceiver system 102 on condition that the monitoring camera 101b of the building management system shown in FIG. 3 is put in an elevator for moving up and down.

As show in FIG. 16, on condition that the elevator remains stopped, the transceiver system 102 stays in its stopped condition 1601 where the power source supply thereto is kept shut down. In response to a human-detect signal generated when a human sensor put in the elevator senses the presence of a human, or an electric signal 1605, which is a start signal generated when the elevator starts moving up or down, the transceiver system 102 is caused to transition from the stopped condition 1601 to the intermittent-operation mode 1602.

On receipt of an emergency-earthquake-warning signal 1604 or and 1607, the emergency uninterrupted setting signal 1202 supplied to the buffer control circuit 813 by the external device is turned to an active level. As a result, the transceiver system 102 is made to transition from the stopped condition 1601 or the intermittent-operation mode 1602 to the uninterrupted-operation mode 1603. After the transition to the uninterrupted-operation mode 1603, the transceiver system 102 can receive received packets successively.

However, in response to an emergency-operation-cancel signal 1608 issued after the elevator has been stopped owing to an earthquake, the emergency uninterrupted setting signal 1202 is turned to a non-active level, and then the operation mode of the transceiver system 102 is forced to transition from the uninterrupted-operation mode 1603 to the intermittent-operation mode 1602.

After the transition to the intermittent-operation mode 1602, in response to an electric signal 1606 generated in a period during which the elevator remains stopped, or when the human sensor in the elevator senses the absence of a human, the operation mode of the transceiver system 102 is caused to transition from the intermittent-operation mode 1602 to the stopped condition 1601.

As described above, the buffer control circuit 813 reacts to the emergency uninterrupted setting signal 1202 arranged in response to the emergency-earthquake-warning signals 1604 and 1607, and thus the transceiver system 102 is caused to transition from the stopped condition 1601 or the intermittent-operation mode 1602 to the uninterrupted-operation mode 1603. After the transition to the uninterrupted-operation mode 1603, the transceiver system 102 can accept received packets successively.

Figure 17:
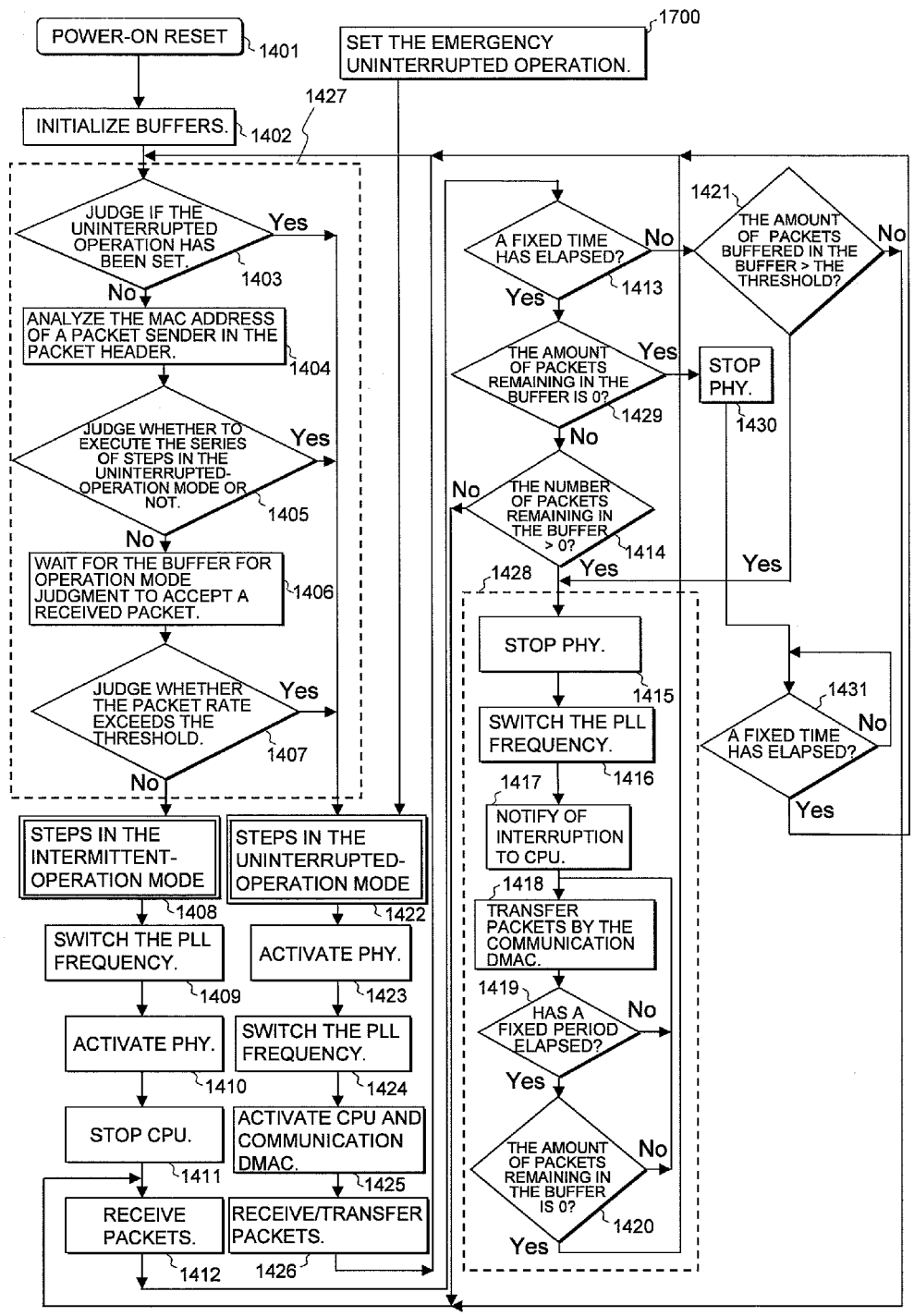
FIG. 17 is a flow chart showing the operation flow of the semiconductor integrated circuit according to the first embodiment of the invention, which materializes the transceiver system 102, and the chart for showing that the operation flow shown in FIG. 11 includes the step 1700 of emergency uninterrupted operation setting, from which the execution of the operation can be directly moved to a series of steps 1422 involved in the uninterrupted-operation mode.

FIG. 17 is a flow chart showing the operation flow of the semiconductor integrated circuit according to the first embodiment of the invention, which materializes the transceiver system 102, and the chart for showing that the operation flow shown in FIG. 11 includes the step 1700 of emergency uninterrupted operation setting, from which the execution of the operation can be directly moved to a series of steps 1422 involved in the uninterrupted-operation mode.

The step 1700 of emergency uninterrupted operation setting shown in FIG. 17 is started by supplying the buffer control circuit 813 with the emergency uninterrupted setting signal 1202, which is arranged in response to the emergency-earthquake-warning signals 1604 and 1607. After the start of the step 1700 of emergency uninterrupted operation setting, if the working condition of the transceiver system 102 at the start of the step 1700 is the stopped condition 1601 where the power source supply thereto is kept shut down, the power source supply is started, and the uninterrupted-operation mode is begun. Further, in case that the working condition of the transceiver system 102 at the start of the step 1700 of emergency uninterrupted operation setting is the intermittent-operation mode, after the packet buffering and transfer in the intermittent-operation mode have been completed, the operation mode of the transceiver system 102 is forced to transition from the intermittent-operation mode to the uninterrupted-operation mode.

Second Embodiment

The second embodiment of the invention, which will be described below, differs from the first embodiment of the invention, which has been described above, in the following point: the semiconductor integrated circuit according to the second embodiment of the invention is additionally provided with a function of automatically determining one of the intermittent-operation mode and the uninterrupted-operation mode according to a time zone of the working time of the transceiver system 102.

<<Time-Zone-Dependent Mode Setting Register>>

Figures 18, 19:
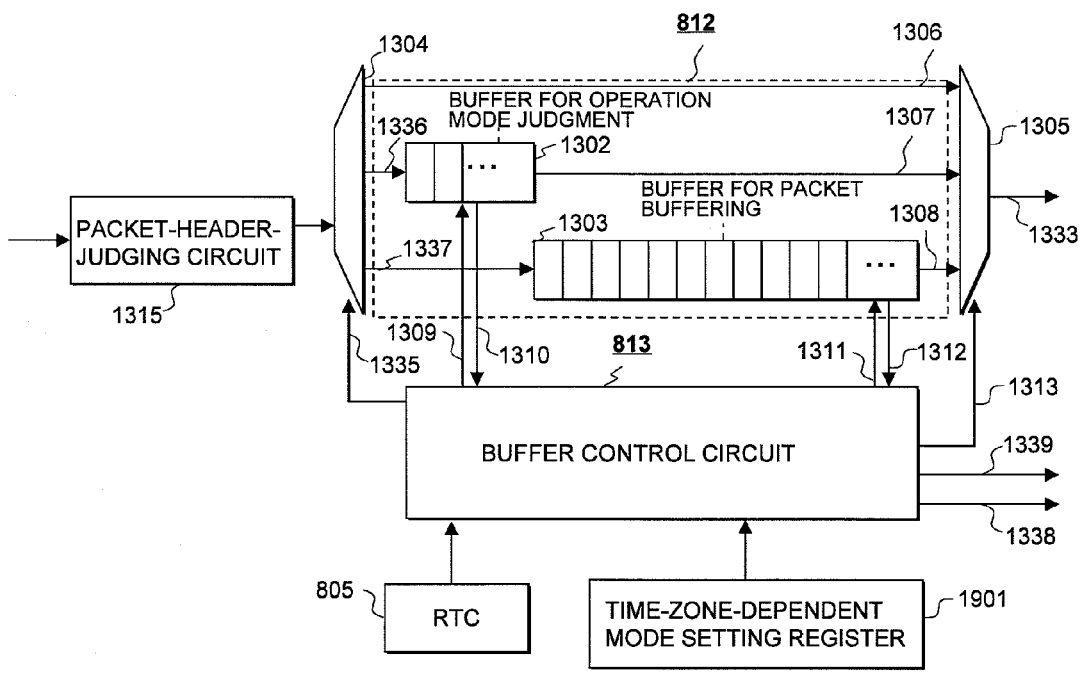
FIG. 18 is a table showing setting examples of the operation mode connected with a time-zone-dependent mode setting register for realizing the function of automatically determining the operation mode according to a time zone, which is added to the transceiver system associated with the second embodiment of the invention.
FIG. 19 is a diagram showing a circuit configuration to realize the function of automatically determining the operation mode according to a time zone, which is newly added in the transceiver system 102 connected with the second embodiment of the invention, and the configuration involves: the buffer memory 812 and buffer control circuit 813, both associated with the first embodiment of the invention and shown in FIG. 10; and a real-time clock (RTC) 805 and a time-zone-dependent mode setting register 1901, both added as peripheral circuits of the buffer control circuit 813.

FIG. 18 is a table showing setting examples of the operation mode connected with a time-zone-dependent mode setting register for realizing the function of automatically determining the operation mode according to a time zone, which is added to the transceiver system 102 associated with the second embodiment of the invention.

As shown in the table of FIG. 18, the operation mode of the transceiver system 102 is set to the uninterrupted-operation mode for a typical activity time zone between am 7:00 and pm 9:00 inclusive, whereas as to a typical inactivity time zone between pm 10:00 and am 6:00 inclusive, the operation mode of the transceiver system 102 is set to the intermittent-operation mode.

<<Peripheral Circuits of the Buffer Memory>>

FIG. 19 is a diagram showing a circuit configuration to realize the function of automatically determining the operation mode according to a time zone, which is newly added in the transceiver system 102 connected with the second embodiment of the invention, and the configuration involves: the buffer memory 812 and buffer control circuit 813, both associated with the first embodiment of the invention and shown in FIG. 10; and a real-time clock (RTC) 805 and a time-zone-dependent mode setting register 1901, both added as peripheral circuits of the buffer control circuit 813.

As shown in FIG. 19, the buffer control circuit 813 is connected with the real-time clock (RTC) 805 and the time-zone-dependent mode setting register 1901, and the real-time clock 805 provides time zone data of the present moment to the buffer control circuit 813. Therefore, according to the time zone data of the present moment supplied from the real-time clock 805, the buffer control circuit 813 reads, from the time-zone-dependent mode setting register 1901, the operation mode set for the time zone which the present moment belongs to.

<<Operation Flow>>

Figure 20:
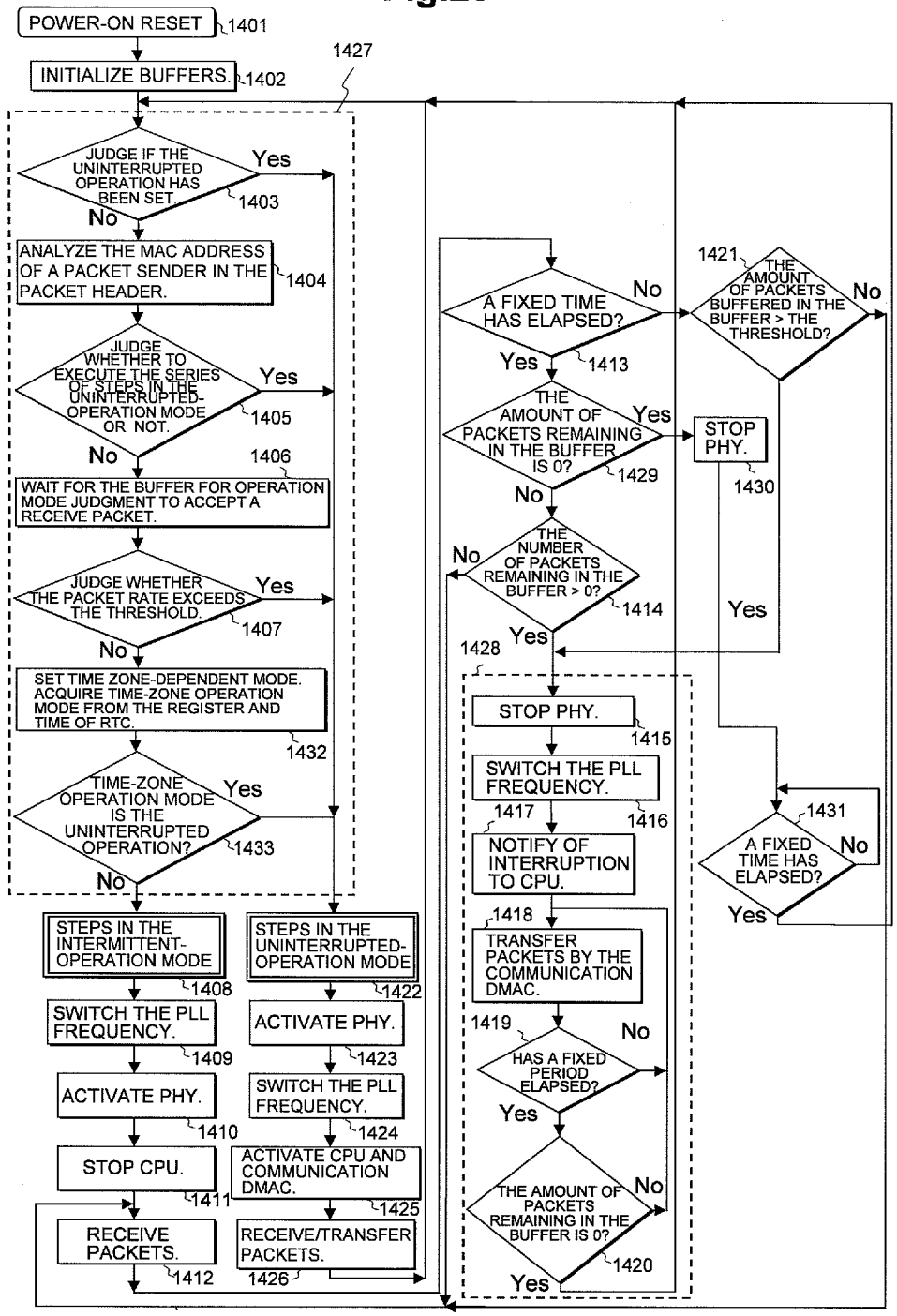
FIG. 20 is a flow chart for explaining the operation flow of the semiconductor integrated circuit according to the second embodiment of the invention, which materializes the transceiver system 102.

FIG. 20 is a flow chart for explaining the operation flow of the semiconductor integrated circuit according to the second embodiment of the invention, which materializes the transceiver system 102.

The operation flow of the semiconductor integrated circuit according to the second embodiment of the invention shown in FIG. 20 differs from the operation flow of the semiconductor integrated circuit according to the first embodiment of the invention, which has been described with reference to FIG. 11 in the point as described below.

In the operation flow of the semiconductor integrated circuit according to the second embodiment of the invention shown in FIG. 20, the step 1432 of time zone acquisition and the step 1433 of uninterrupted operation time zone judgment are added to the series of steps 1427 involved with operation mode judgment, which is associated with the first embodiment of the invention. Accordingly, in the operation flow shown in FIG. 20, if the result of the judgment in the step 1407 of packet rate judgment is "No", the execution of the operation is moved to the step 1432 of time zone acquisition.

In the step 1432 of time zone acquisition, the operation mode set for the time zone which the present moment belongs to is read from the time-zone-dependent mode setting register 1901 by the buffer control circuit 813 according to the time zone data of the present moment supplied from the real-time clock 805. In the subsequent step 1433 of uninterrupted operation time zone judgment, the buffer control circuit 813 judges whether the operation mode of the time zone of the present moment read in the step 1432 of time zone acquisition is the uninterrupted-operation mode. If the result of the judgment in the step 1433 is "No", the execution of the operation is moved to the series of steps 1408 in the intermittent-operation mode. However, if the result of the judgment in the step 1433 is "Yes", the execution of the operation is moved to the series of steps 1422 in the uninterrupted-operation mode.

Therefore, according to the second embodiment of the invention described with reference to FIGS. 18 to 20, the operation mode of the transceiver system 102 can be set to the uninterrupted-operation mode in a typical activity time zone between am 7:00 and pm 9:00 inclusive, for a packet transmitted by the security control device 101c with a received packet having a low packet rate. Consequently, the authentication processing capability when going into each room in the typical activity time zone can be enhanced.

While the invention made by the inventor has been described above specifically based on the various embodiments thereof, the invention is not limited to the embodiments. It is obvious that various changes and modifications may be made without departing from the subject matter of the invention.

For instance, regarding the invention, the semiconductor chip of the physical-layer transceiver (PHY) 802, and the semiconductor chip of the micro controller unit (MCU) 801 are not limited to a form of SIP (System-In-Package) sealed by a plastic sealing resin as described in FIG. 5. That is, the physical-layer transceiver (PHY) 802 and the micro controller unit (MCU) 801 may be integrated into a semiconductor chip in a form of SOC (System-On-Chip).

Further, on condition that the above-described SOC is fabricated by a DRAM-logic hybrid semiconductor manufacturing process, the external memory 1217 composed of a DRAM semiconductor chip shown in FIG. 5 can be integrated into a single semiconductor chip taking a SOC form.

What is claimed is:

1. A transceiver system comprising:
   a physical-layer transceiver; and
   a logical-layer media access controller,
   wherein the physical-layer transceiver can execute transmitted and received data communications with a plurality of terminal devices,
   wherein the logical-layer media access controller can control memory transfer of transmitted and received data,
   wherein the transceiver system can be set in one operation mode selected from among an intermittent-operation mode and an uninterrupted-operation mode,
   wherein, in the intermittent-operation mode, an operation of the physical-layer transceiver and an operation of the logical-layer media access controller are executed alternately, and
   wherein, in the uninterrupted-operation mode, an operation of the physical-layer transceiver and an operation of the logical-layer media access controller are executed in parallel.

2. The transceiver system according to claim 1,
   wherein the transceiver system can be set in the one operation mode according to unique identification data of the plurality of terminal devices.

3. The transceiver system according to claim 2,
   wherein, in the intermittent-operation mode, supply of an operating-source voltage to the physical-layer transceiver is stopped according to a control signal generated by the logical-layer media access controller, thereby to stop the operation of the physical-layer transceiver for a period where the operation of the logical-layer media access controller is executed.

4. The transceiver system according to claim 3, further comprising:
   a central processing unit; and
   a direct memory access controller,
   wherein the physical-layer transceiver can cope with a physical feature of a network to which the plurality of terminal devices are linked,
   wherein the logical-layer media access controller is operable to control the central processing unit and the direct memory access controller, and
   wherein the memory transfer of transmitted and received data by the logical-layer media access controller is executed by the direct memory access controller which is controlled according to operation control by the central processing unit.

5. The transceiver system according to claim 4,
   wherein the logical-layer media access controller includes a buffer memory operable to buffer transmitted data sent from the plurality of terminal devices,
   wherein the transmitted data can be buffered in the buffer memory during the operation of the physical-layer transceiver in intermittent-operation mode, and
   wherein the transmitted data buffered in the buffer memory are read out during the operation of the logical-layer media access controller in the intermittent-operation mode.

6. The transceiver system according to claim 5,
   wherein, during the operation of the logical-layer media access controller in the intermittent-operation mode, the transmitted data read from the buffer memory are subjected to memory transfer by the direct memory access controller.

7. The transceiver system according to claim 6,
wherein the unique identification data of the plurality of terminal devices are packet header data of the transmitted data transmitted by the plurality of terminal devices.

8. The transceiver system according to claim 7,
wherein the packet header data of the transmitted data as the unique identification data of the plurality of terminal devices are address data of the plurality of terminal devices.

9. The transceiver system according to claim 8,
wherein the logical-layer media access controller includes an address-setting register for storing the address data as the unique identification data for setting the operation mode of the transceiver system to the uninterrupted-operation mode, which is the one operation mode.

10. The transceiver system according to claim 9,
wherein the logical-layer media access controller can be supplied with an external control signal provided from outside the transceiver system, and
wherein the logical-layer media access controller is capable of forcibly setting an operation mode of the transceiver system to the uninterrupted-operation mode in response to the external control signal.

11. A method of operating a transceiver system including a physical-layer transceiver and a logical-layer media access controller, the method comprising the steps of:
executing transmitted and received data communications with a plurality of terminal devices by using the physical-layer transceiver; and
controlling memory transfer of the transmitted and received data by using the logical-layer media access controller,
wherein the transceiver system can be set to one operation mode selected from among an intermittent-operation mode and an uninterrupted-operation mode,
wherein, in the intermittent-operation mode, an operation of the physical-layer transceiver, and an operation of the logical-layer media access controller are executed alternately, and
wherein, in the uninterrupted-operation mode, the operation of the physical-layer transceiver, and the operation of the logical-layer media access controller are executed in parallel.

12. The method of operating a transceiver system according to claim 11,
wherein the transceiver system can be set to the one operation mode according to unique identification data of the plurality of terminal devices.

13. The method of operating a transceiver system according to claim 12,
wherein in the intermittent-operation mode, supply of an operating-source voltage to the physical-layer transceiver is stopped according to a control signal generated by the logical-layer media access controller, thereby to stop the operation of the physical-layer transceiver for a period where the operation of the logical-layer media access controller is executed.

14. The method of operating a transceiver system according to claim 13,
wherein the transceiver system further includes a central processing unit, and a direct memory access controller,
wherein the physical-layer transceiver can cope with a physical feature of a network to which the plurality of terminal devices are linked,
wherein the logical-layer media access controller is operable to control the central processing unit and the direct memory access controller, and
wherein the memory transfer of transmitted and received data by the logical-layer media access controller is executed by the direct memory access controller which is controlled according to operation control by the central processing unit.

15. The method of operating a transceiver system according to claim 14,
wherein the logical-layer media access controller includes a buffer memory operable to buffer transmitted data sent from the plurality of terminal devices,
wherein the transmitted data can be buffered in the buffer memory during the operation of the physical-layer transceiver in intermittent-operation mode, and
wherein the transmitted data buffered in the buffer memory are read out during the operation of the logical-layer media access controller in the intermittent-operation mode.

16. The method of operating a transceiver system according to claim 15,
wherein, during the operation of the logical-layer media access controller in the intermittent-operation mode, the transmitted data read from the buffer memory are subjected to memory transfer by the direct memory access controller.

17. The method of operating a transceiver system according to claim 16,
wherein the unique identification data of the plurality of terminal devices are packet header data of the transmitted data transmitted by the plurality of terminal devices.

18. The method of operating a transceiver system according to claim 17,
wherein the packet header data of the transmitted data as the unique identification data of the plurality of terminal devices are address data of the plurality of terminal devices.

19. The method of operating a transceiver system according to claim 18,
wherein the logical-layer media access controller includes an address-setting register for storing the address data as the unique identification data for setting the operation mode of the transceiver system to the uninterrupted-operation mode, which is the one operation mode.

20. The method of operating a transceiver system according to claim 19,
wherein the logical-layer media access controller can be supplied with an external control signal provided from outside the transceiver system, and
wherein the logical-layer media access controller is capable of forcibly setting an operation mode of the transceiver system to the uninterrupted-operation mode in response to the external control signal.

* * * * *